(12) United States Patent
Engelland et al.

(10) Patent No.: US 11,148,688 B2
(45) Date of Patent: Oct. 19, 2021

(54) UNATTENDED RAILCAR MOTION CONTROL SYSTEM

(71) Applicant: Enersul Inc., Calgary (CA)

(72) Inventors: Mark Charles Engelland, Chetwynd (CA); Trevor Michael Greer, Heritage Pointe (CA); David Alexander Shaw, Calgary (CA)

(73) Assignee: Enersul Inc., Calgary (CA)

( * ) Notice: Subject to any disclaimer, the term of this patent is extended or adjusted under 35 U.S.C. 154(b) by 159 days.

(21) Appl. No.: 16/273,910

(22) Filed: Feb. 12, 2019

(65) Prior Publication Data

US 2019/0248389 A1 Aug. 15, 2019

Related U.S. Application Data

(60) Provisional application No. 62/629,509, filed on Feb. 12, 2018.

(51) Int. Cl.

| | |
|---|---|
| *B60T 8/17* | (2006.01) |
| *B60T 13/10* | (2006.01) |
| *B61H 11/02* | (2006.01) |
| *B60T 17/22* | (2006.01) |
| *B60T 7/18* | (2006.01) |
| *B60T 13/66* | (2006.01) |
| *B60T 8/88* | (2006.01) |

(52) U.S. Cl.
CPC ............... *B61H 11/02* (2013.01); *B60T 7/18* (2013.01); *B60T 8/1705* (2013.01); *B60T 8/885* (2013.01); *B60T 13/10* (2013.01); *B60T 13/665* (2013.01); *B60T 17/228* (2013.01); *B60T 2270/402* (2013.01); *B60T 2270/413* (2013.01)

(58) Field of Classification Search
CPC ....... B61H 11/02; B60T 13/10; B60T 8/1705; B60T 7/18; B60T 2270/413; B60T 2270/402
See application file for complete search history.

(56) References Cited

U.S. PATENT DOCUMENTS

| | | | | |
|---|---|---|---|---|
| 1,065,659 A | * | 6/1913 | Bohannon | F16K 31/56 251/74 |
| 1,305,738 A | * | 6/1919 | Nevens | B61L 3/04 246/190 |
| 1,450,143 A | * | 3/1923 | Dillman | E04H 15/00 135/149 |
| 2,121,552 A | * | 6/1938 | Stevens | B61L 3/04 246/190 |
| 3,346,223 A | * | 10/1967 | Broling | B61D 45/005 410/63 |

(Continued)

*Primary Examiner* — Melody M Burch
(74) *Attorney, Agent, or Firm* — Arnold & Porter Kaye Scholer

(57) ABSTRACT

A method and mechanism for initiating an emergency stop for an unattended railcar is disclosed. The method may include using a trip arm placed alongside the railway tracks at a designated stop point that may contact a portable trip-cock lever arm that extends out beyond the perimeter of the railcar if the railcar reaches the stop point as it moves along the track. The trip-cock lever arm may be attached to a valve that is connected to the pneumatic brake system of the unattended railcar. As the trip-cock lever arm rotates, the valve may open to release the air pressure in the pneumatic brake system causing the brakes to engage the wheels causing the railcar to stop.

14 Claims, 20 Drawing Sheets

(56) References Cited

U.S. PATENT DOCUMENTS

| | | | | |
|---|---|---|---|---|
| 4,404,987 A * | 9/1983 | Bridigum | ............... | B60T 7/18 |
| | | | | 137/556 |
| 5,601,259 A * | 2/1997 | DiChiara | ............... | B60T 7/124 |
| | | | | 188/111 |
| 6,334,508 B1 * | 1/2002 | Shields | ............... | A01M 31/02 |
| | | | | 182/116 |
| 7,753,317 B1 * | 7/2010 | Schirmer | ............... | B61K 5/06 |
| | | | | 246/163 |
| 8,061,662 B1 * | 11/2011 | Bartek | ............... | B61L 23/06 |
| | | | | 246/203 R |
| 2006/0197352 A1 * | 9/2006 | Bassett | ............... | B60R 11/06 |
| | | | | 296/37.6 |
| 2012/0217427 A1 * | 8/2012 | Scharpf | ............... | B60T 17/228 |
| | | | | 251/321 |

* cited by examiner

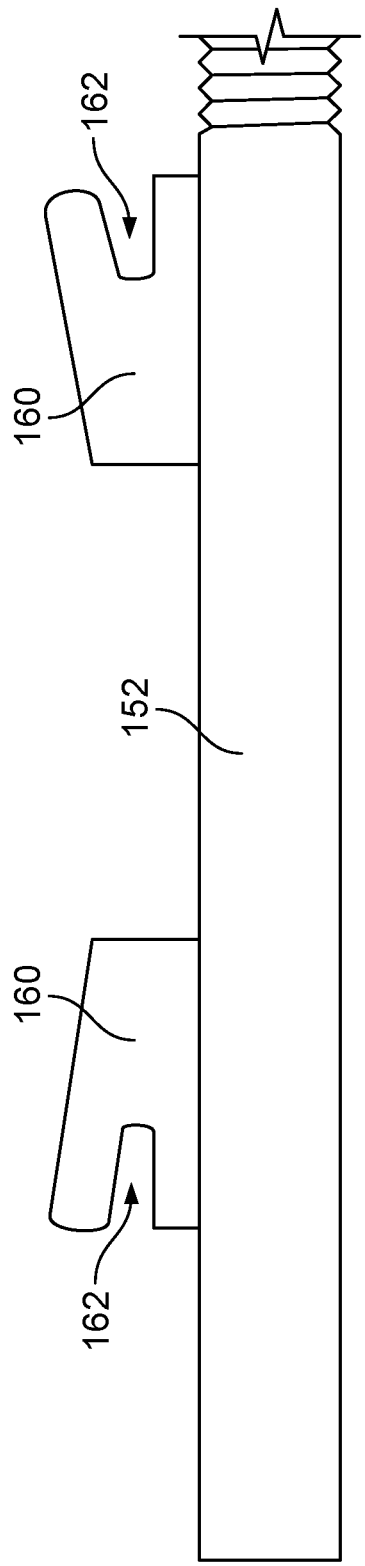
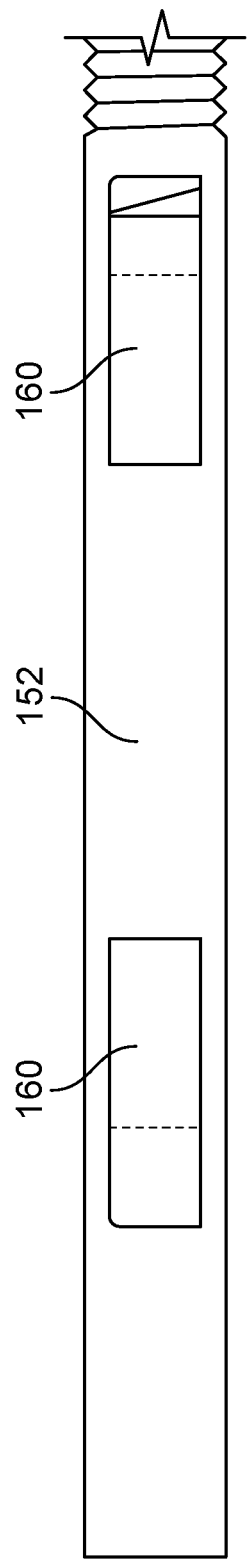
FIG. 7A
FIG. 7B

UNATTENDED RAILCAR MOTION CONTROL SYSTEM

CROSS-REFERENCE TO RELATED APPLICATIONS

This application claims priority to U.S. Provisional Application No. 62/629,509 filed on Feb. 12, 2018. The above referenced application is incorporated by reference in its entirety.

FIELD OF INVENTION

This disclosure relates to a system for controlling the movement of unattended railway cars without direct supervision.

BACKGROUND

As railcars are moved along a railyard, the railcars may be left unattended by an operator at various times. For example, a railcar may be unattended during loading and unloading of cargo to the railcar. While left unattended, a railcar may begin to move unexpectedly or may travel beyond the designated loading or unloading point, which raises the risk of accidents from the railcar's movement or spilling of the cargo during the loading process.

BRIEF SUMMARY

This disclosure may relate to a system for controlling motion of an unattended railcar comprising a trip-cock assembly, where the trip-cock assembly includes a trip-cock lever connected to a trip-cock valve assembly. The trip-cock valve assembly may include a valve connected to a first end of a pipe and a fitting connected to a second end of the pipe, and where the trip-cock valve assembly is configured to connect to a pneumatic braking system of an unattended railcar. The trip-cock lever may be adjustable from a folded position to an extended position, such that when the trip-cock lever is in the extended position, the trip-cock lever extends beyond an exterior perimeter of the unattended railcar. A trip arm may be located adjacent a railway track at a predetermined stop point within a railyard such that when the unattended railcar moves toward the predetermined stop point the trip-cock lever contacts the trip arm, the trip-cock lever then opens the valve on the trip-cock valve assembly causing air in the pneumatic braking system of the unattended railcar to be released. The trip-cock lever may be directly attached to the valve of the trip-cock assembly, and the fitting connects to a flexible hose, where the flexible hose includes a coupler configured to connect to a brake pipe of the pneumatic braking system of the unattended railcar. When the trip-cock assembly is in the folded position, the trip-cock assembly may have an overall length of less than 5 feet. Additionally, the trip-cock assembly may have an overall weight of less than 50 pounds.

Other aspects of the disclosure may relate to a system for controlling motion of an unattended railcar where the trip-cock assembly may be arranged on the unattended railcar such that the trip-cock lever is in a substantially horizontal orientation. The pipe of the trip-cock valve assembly may have a first lug near the first end and a second lug near the second end, where the first lug and the second lug engage the unattended railcar to secure the trip-cock assembly to the railcar. The first lug and the second lug each may have an opening extending through each lug, where each opening has a pair of converging surfaces. In some embodiments, the trip-cock assembly may be secured to the unattended railcar using a magnetic connection and may be releasably attached to the unattended railcar. Additionally, the valve of the trip-cock valve assembly may be a solenoid valve.

Still other aspects of the disclosure may relate to a method for controlling motion of an unattended railcar comprising: determining a no travel point along a railway track for an unattended railcar, determining a stop point to initiate braking for the unattended railcar prior to the no travel point, and installing a trip arm at the stop point adjacent the railway track. The method may also comprise attaching a trip-cock assembly to the unattended railcar, where the trip-cock assembly is attached to a pneumatic braking system of the unattended railcar, and the trip-cock assembly includes a valve connected to a first end of a pipe and a fitting connected to a second end of the pipe opposite the first end, and a trip-cock lever having a first end connected to the valve and a second end that is unsupported opposite the first end. The trip-cock lever may extend beyond an exterior perimeter of the unattended railcar. When the unattended railcar moves toward the predetermined stop point, the trip-cock lever contacts the trip arm causing the trip-cock lever to rotate which opens the valve causing air in the pneumatic braking system of the unattended railcar to be released. The pipe may be secured to the unattended railcar using a mechanical connection such that the trip-cock assembly is releasably attached. In addition, the pipe may have a pair of lugs, wherein the lugs secure the trip-cock assembly to the railcar. The fitting attached to the second end of the pipe may be connected to a flexible hose, where the flexible hose is configured to connect to the pneumatic braking system of an unattended railcar.

Additional aspects of this disclosure may relate to a braking system for a railcar comprising: an air compressor configured to supply compressed air to the braking system, a main reservoir connected to the air compressor, a regulating valve connected to the main compressor, a source brake pipe connected to the regulating valve, where the source brake pipe is connected to a brake pipe of a railcar, and a fluid injector arranged between the regulating valve and the source brake pipe, where the fluid injector injects a fluid into the braking system, wherein the fluid has a freezing point below −40° C. The fluid may be injected at a pressure within a range of 90 psi and 200 psi and may also include a leak detection component. In addition, the fluid may be injected intermittently.

BRIEF DESCRIPTION OF DRAWINGS

To allow for a more full understanding of the present disclosure, it will now be described by way of example, with reference to the accompanying drawings in which:

FIG. 7A depicts a top view of a rigid pipe of the trip-cock assembly of FIG. 5 as disclosed herein;

FIG. 7B depicts a side view of the rigid pipe of the trip-cock assembly of FIG. 7A as disclosed herein;

DETAILED DESCRIPTION

In the following description of various example structures and methods according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. The terms "substantially horizontal" and "substantially vertical" may be interpreted within +/−15 degrees of horizontal and vertical respectively. Nothing in this specification should be construed as requiring a specific three-dimensional orientation of structures in order to fall within the scope of this invention, unless explicitly specified by the claims. The reader is also advised that the attached drawings are not necessarily drawn to scale.

In general, this disclosure relates to a system for controlling the motion of unattended railcars within a railyard to keep them from moving beyond a designated point or location. Preventing the unattended railcars from moving beyond a designated point or location may assist in the loading and unloading cargo and in preventing of accidents. The system 100 may primarily work for slow moving unattended railcars. The unattended railcars may be connected to a locomotive, railcar mover, and or car indexer while in the railyard, however, the operator may leave the railcars unattended such that the operator is unable to apply the brakes. The unattended railcars may be freight or passenger railcars, or any vehicle configured to move on railway tracks. Additionally, an unattended railcar may be any railcar or engine with or without cars that is intended to operate on a railway track at speeds greater than fifteen miles per hour.

Figure 1:
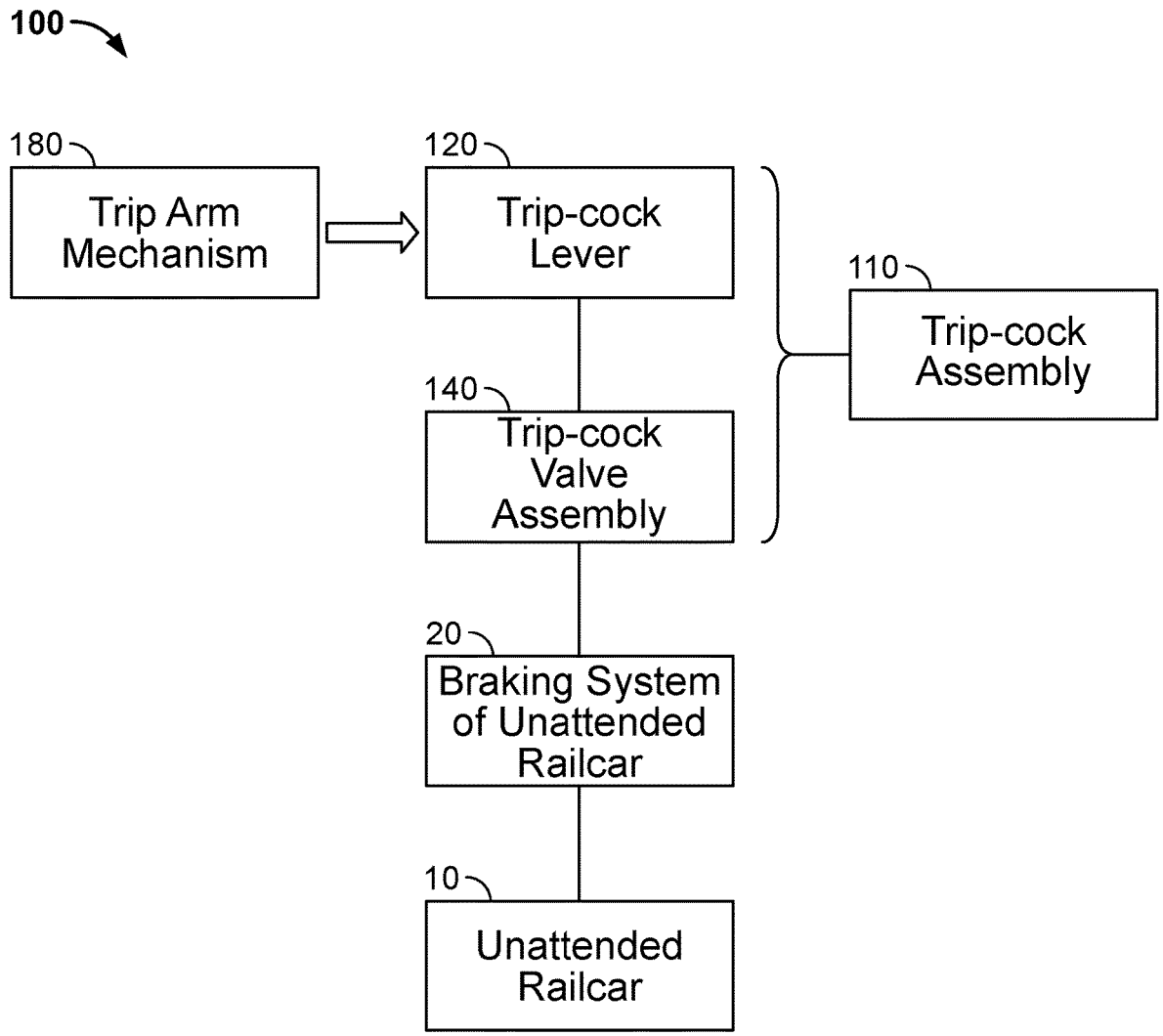
FIG. 1 depicts a schematic of an exemplary railcar motion control system for a railcar as disclosed herein.

FIG. 1 discloses a system 100 for controlling the motion of an unattended railcar 10 comprising a portable and transferable trip-cock assembly 110 that is easily connected and disconnected to an unattended railcar 10 and a trip arm 180 placed adjacent the railway track 30. The trip-cock assembly 110 may include a trip-cock lever 120 and a trip-cock valve assembly 140. The trip-cock valve assembly 140 may be connected to the pressurized pneumatic braking system 20 of a typical railcar 10. In addition, the trip-cock assembly 110 may be releasably mounted and secured anywhere on the unattended railcar 10 such as to a front, a central region, or a rear of the unattended railcar 10. The trip-cock lever 120 may connect to the valve assembly 140 and may extend beyond the exterior perimeter of the railcar 10 when the trip-cock assembly 110 is secured to the railcar 10 when the trip-cock assembly 110 is in an extended position. When the trip-cock lever 120 is in the extended position, the trip-cock lever 120 may contact the trip arm 180 arranged adjacent the railway tracks 30.

Figure 1A:
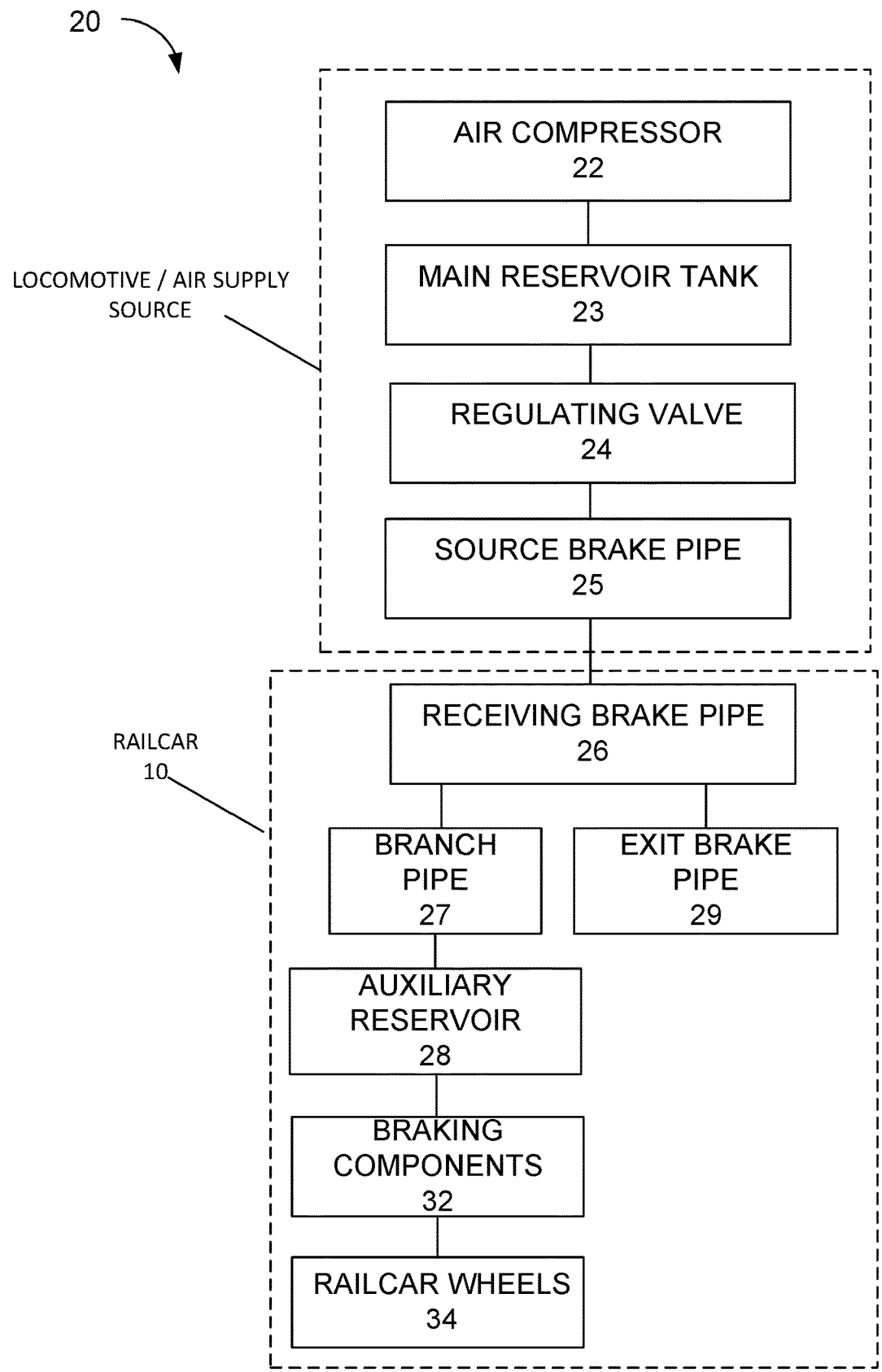
FIG. 1A depicts a schematic of the braking system of an exemplary railcar as disclosed herein.

FIG. 1A illustrates a schematic of a typical pneumatic braking system 20 of a typical railcar 10. The pneumatic braking system 20 is pressurized to keep the wheels 34 free to turn and the brakes of the railcar 10 unengaged to the wheels 34 of the railcar 10. If the air pressure drops, the brakes will engage the wheels 34 causing the railcar 10 to stop, which allows time to engage the manual hand brake of the railcar 10 or to place a manual derail device on the railway track, as appropriate for the situation and conditions. However, if the air pressure drops to near ambient air pressure, the pneumatic brakes may disengage and become inoperable. The braking system 20 may comprise an air compressor 22 that is connected to a main reservoir tank 23 to hold a portion of the compressed air in the system 20. A regulating valve 24 may be positioned downstream of the main reservoir tank 23 to provide a predetermined pressure to the braking system 20. A source brake pipe 25 may be connected to the regulating valve 24. The source brake pipe 25 may provide a connection point to the railcar 10 to provide the air supply of the braking system 20 to any connected railcars 10. The air compressor 22, reservoir 23, regulating valve 24, and source brake pipe 25 may be provided on a locomotive or other mobile platform such as a railcar mover or other vehicle arranged to operate on a railway track connected to the railcar 10. The source brake pipe 25 may be connected to a receiving brake pipe 26 of the railcar 10. The receiving brake pipe 26 may be connected to a branch pipe 27 that provides the air to an auxiliary reservoir 28 that enables the braking components 32 to engage the wheels 34. The receiving brake pipe 26 may also connect to an exit brake pipe 29 located on the opposite end of the railcar 10 of the receiving brake pipe 26. The trip-cock assembly 110 may be attached to the exit brake pipe 29 of the braking system 20. If a group of unattended railcars is positioned along the railway tracks, the braking systems 20 of each railcar 10 may be attached sequentially by coupling the brake pipe of each railcar to the brake pipe of the adjacent railcar linking each railcar's braking system into a single pneumatic system. Where the railcars 10 are connected as a group of railcars, the source air supply may be attached at a railcar 10 at one end of the group of railcars with the trip-cock assembly 110 attached to a railcar 10 at the opposite end of the group of railcars. In some instances, the trip-cock assembly 110 may be attached to any of the unattended railcars 10 within the group, such as the front railcar, the rear railcar, or any of the railcars in between the front railcar and the rear railcar where the trip-cock assembly 110 is attached to the brake system 20 between any two railcars 10.

The air compressor 22 may help to maintain sufficient air pressure in the brake system 20 to ensure there is adequate pressure in the braking system (or braking systems) 20 for the trip-cock assembly 110 to initiate an emergency stop if necessary. A typical pneumatic braking system 20 may have a brake-pipe pressure within a range between 40 psi and 120 psi. As known to one skilled in the art, cold weather or inefficient seals along the railcar braking system 20 to leak air causing the brake pressure to be too low such that a pressure drop may not engage the brakes for a long enough period of time to stop the railcar or making the brakes inoperable. The air compressor 22 may be a reciprocating or screw style compressor and in some embodiments may be an oil-free type compressor.

As discussed above, the trip arm 180 may contact the trip lever 120 to activate the brakes on the railcar 10. The trip arm 180 may be a vertically extending post that is placed or installed adjacent or alongside the railway tracks 30 at a predetermined stop point 182, where "adjacent or alongside" may, in certain instances, be less than approximately 7 feet from a railway track gauge line, or less than approximately 10 feet from a centerline of the railway track. The trip arm 180 may be removed when not in use or may be secured to maintain the required railway track clearances. The predetermined stop point 182 designates a point or location on the track to initiate an emergency stop to keep the unattended railcar 10 or an unattended railcar 10 positioned at either a front end, a central region, or a rear end of a group of unattended railcars if they are linked together from passing a no travel point. When an unattended railcar 10 with the trip-cock assembly 110 attached reaches the predetermined stop point 182, the trip arm 180 may contact the trip-cock lever 120. When the trip-cock lever 120 contacts the trip arm 180, the force of the contact may cause the trip-cock lever 120 to rotate. The rotation of the trip-cock lever 120 opens a valve 144 on the trip-cock valve assembly 140 releasing the pressurized air within the pneumatic braking system 20 of the railcar 10. As the air is released from the braking system 20 of the railcar 10, the brakes engage the wheels of the railcar 10 bringing the railcar 10 to a stop.

Figure 2:
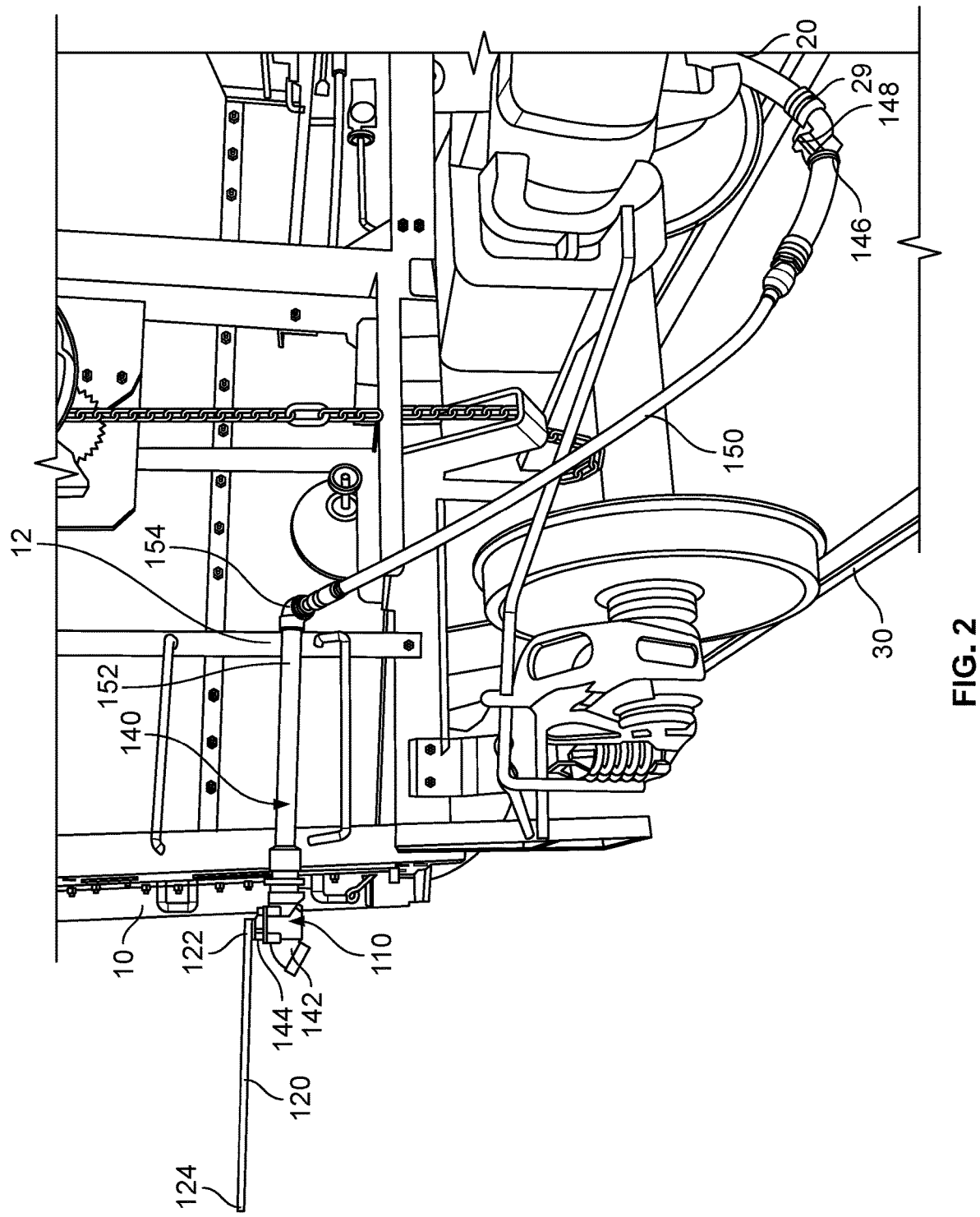
FIG. 2 depicts a left rear perspective view of a trip-cock assembly attached to a railcar of the exemplary railcar motion control system for a railcar of FIG. 1 as disclosed herein.
Figure 6:
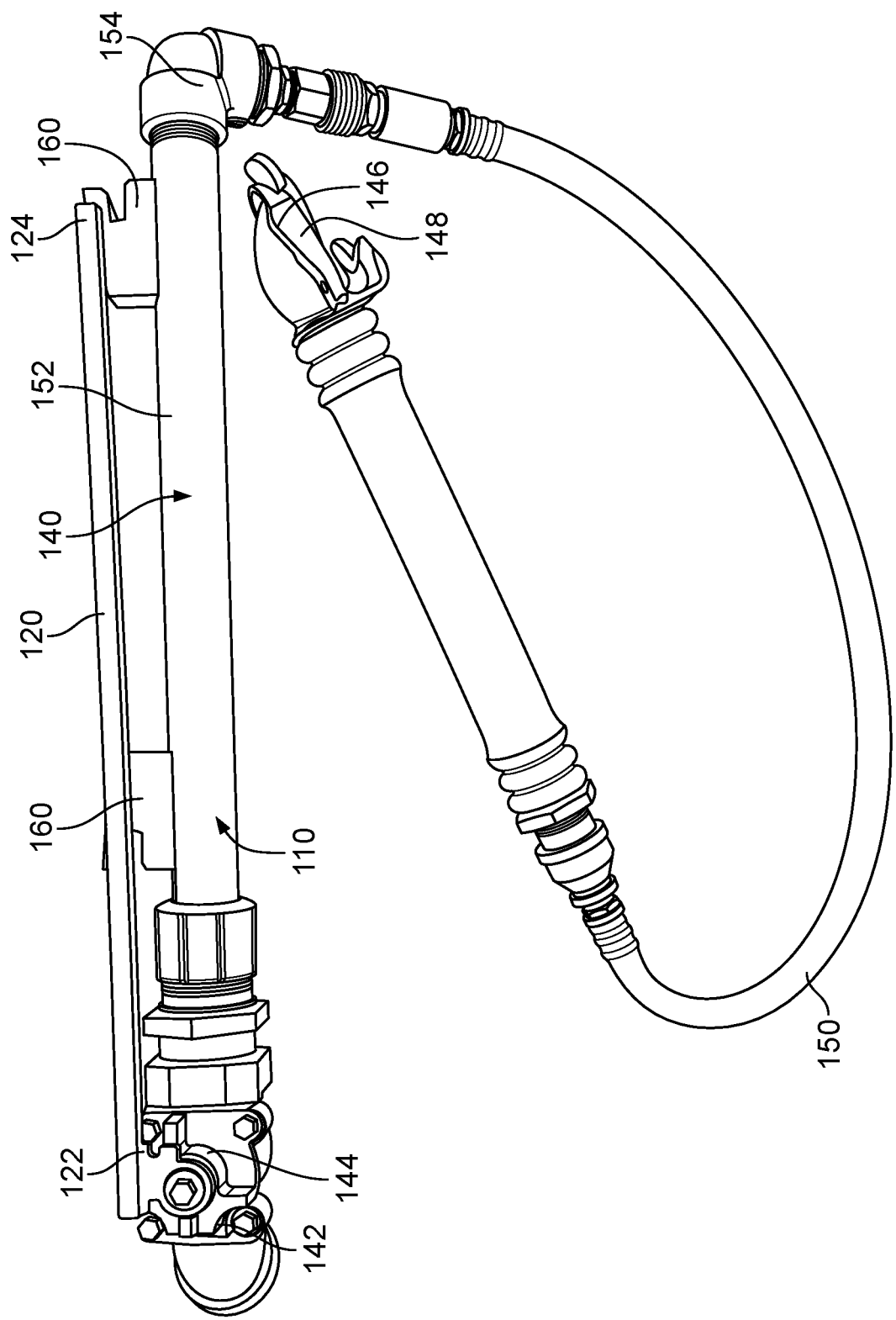
FIG. 6 depicts a top view of the trip-cock assembly in a folded position of the exemplary railcar motion control system for a railcar of FIG. 2 as disclosed herein.

FIG. 2 illustrates an exemplary trip-cock assembly 110 attached to a railcar 10. The trip-cock assembly 110 may comprise a trip-cock lever 120 having a first end 122 that is connected to the first end 142 of the valve assembly 140 and an unsupported second end 124 opposite the first end 122. The valve assembly 140 may have a valve 144 at the first end 142 and a second end 146 having a coupler or fitting 148 to connect to a the brake pipe 29 of the braking system 20 of the railcar 10. Alternatively, the coupler 148 may connect to an angle cock, brake pipe, or other type of connection to the braking system 20 to maintain the air pressure as known to one skilled in the art. A rigid pipe 152 may extend from the valve 144 and to a pipe fitting 154 where the fitting 154 may join to a flexible hose or tubing 150. The flexible hose 150 may allow the trip-cock assembly 110 to attach to variously sized railcars and at a variety of locations on the railcar 10. As discussed above, the trip-cock assembly 110 may be releasably attached to the railcar 10 so it may be moved from one railcar to another. In addition, the weight of the trip-cock assembly 110 may be less than 50 pounds, or within a range of 15 pounds and 40 pounds, or even within a range of 5 pounds to 50 pounds, to allow the trip-cock assembly 110 to be moved and carried by one person. As another feature, the trip-cock assembly 110 may have an overall length measured from the first end 142 of the valve assembly 140 to the pipe fitting 154 of the valve assembly 140 may be less than five feet when the trip-cock lever 120 is in the folded position as shown in FIG. 6 to easily fit in the bed of a pickup truck and to be carried by one person. Alternatively, the overall length measured from the first end 142 of the valve assembly 140 to the pipe fitting 154 of the valve assembly 140 may be less than six feet when the trip-cock lever 120 is folded. As another means of describing the length, the trip-cock assembly may have a length within a range of 3 feet and 6 feet when measured from the first end 142 of the valve assembly 140 to the pipe fitting 154 of the valve assembly 140.

The trip-cock assembly 110 may attach to any protrusion of the unattended railcar 10 to keep the trip-cock assembly 110 in a substantially horizontal orientation by a mechanical connection. For example, the trip-cock assembly 110 may be attached by gravity, by a friction fit, by being clamped onto railcar 10, or by using suction to secure it to the railcar 10. As another option, for a railcar that includes portions made of iron or steel, the trip-cock assembly 110 may be attached by a magnetic connection. In addition, the rigid pipe 152 may have a pair of lugs 160 that are positioned near the ends of the rigid pipe portion 152 of the trip-cock assembly 110 that attach to the railcar 10. Each lug 160 may extend outward from the rigid pipe portion 152 and have an opening 162 extending through each lug 160. The openings 162 of each lug 160 may be spaced to engage a ladder 12 or other features on the railcar 10. For example, the container portion of the railcar 10 may have an I-beam or T-beam protruding from it. In addition, the railcar 10 may have bars of grab-handles, protruding from the surface of the railcar 10 that provide surfaces to attach the trip-cock assembly 110. As an option, the trip-cock assembly 110 may be clamped onto one of these features using mechanical clamps or may be clamped onto a corner or edge feature of the railcar 10. The lugs 160 may help to secure the trip-cock assembly 110 in both a vertical and horizontal orientation on the railcar 10 and thus provide a secure platform to hold the trip-cock lever 120 in a substantially horizontal orientation even through impact with the trip arm 180. As another option, the trip-cock assembly 110 may be inserted into a socket or channel or other hollow opening of a railcar 10.

Figure 3:
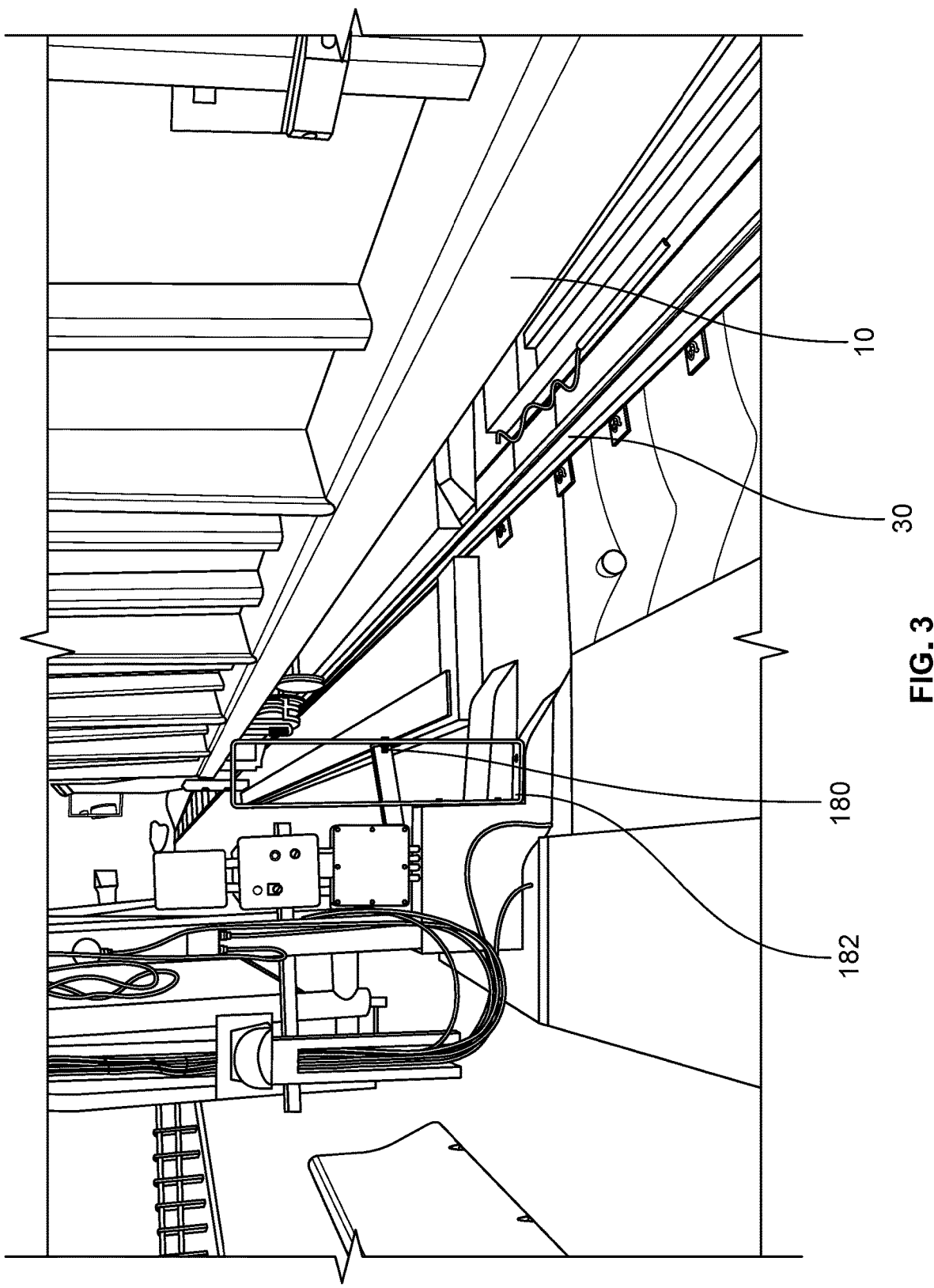
FIG. 3 depicts a left perspective view of a trip arm for the exemplary railcar motion control system for a railcar of FIG. 1 as disclosed herein.
Figure 4:
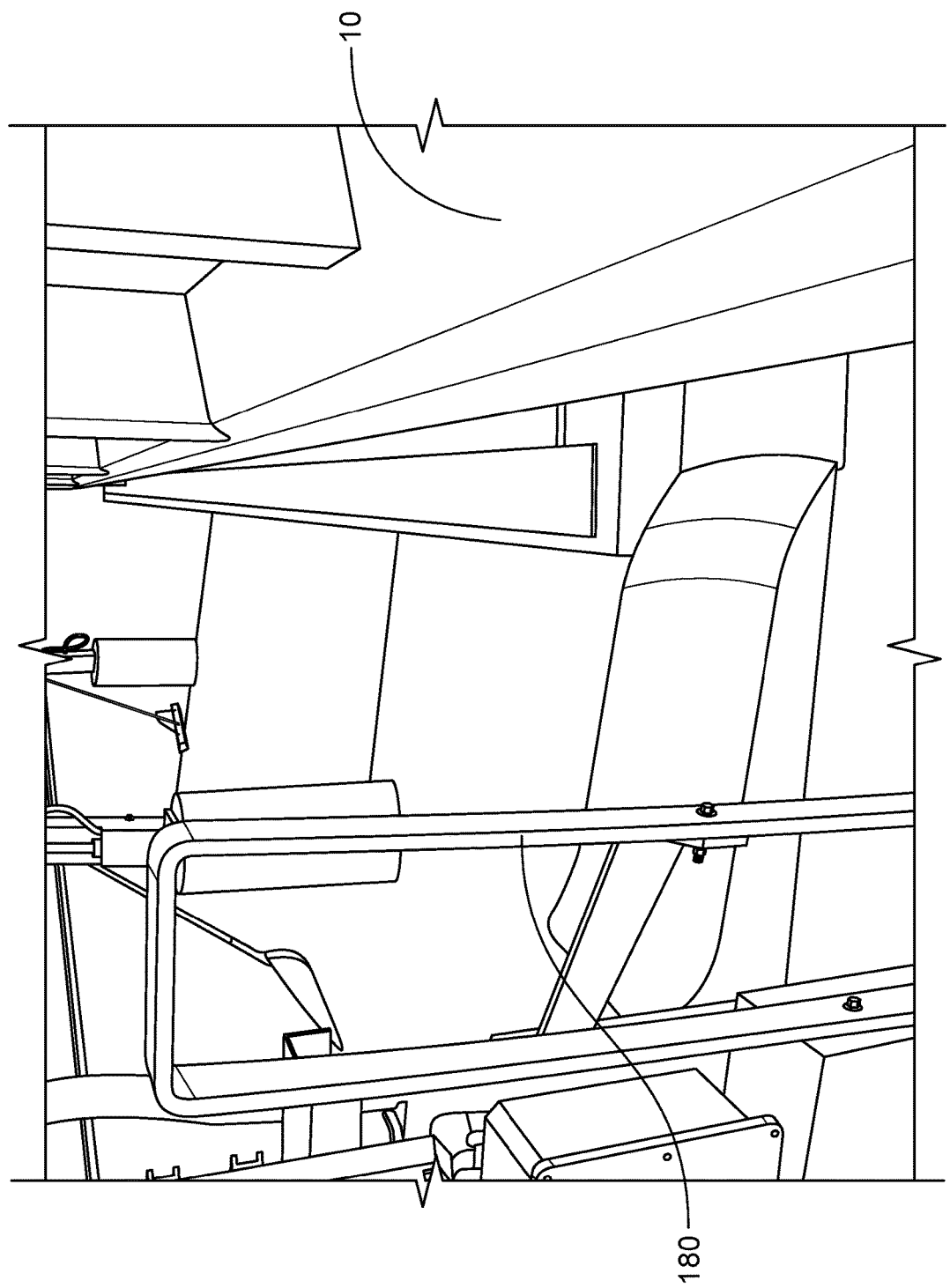
FIG. 4 depicts a right perspective view of the trip arm for the exemplary railcar motion control system for a railcar of FIG. 3 as disclosed herein.

FIGS. 3 and 4 both illustrate exemplary trip arm mechanism 180 extending upward and mounted to the ground alongside the railway tracks 30 at the predetermined stop point 182. The trip arm mechanism 180 may comprise a fixed post or other rigid structure sufficient to contact the trip-cock lever 120 without deforming such that the trip-cock lever 120 rotates sufficiently to open the valve 144. The trip arm mechanism 180 may comprise a fixed post with a single beam or may comprise a plurality of beams as shown in FIGS. 3 and 4.

Figure 5:
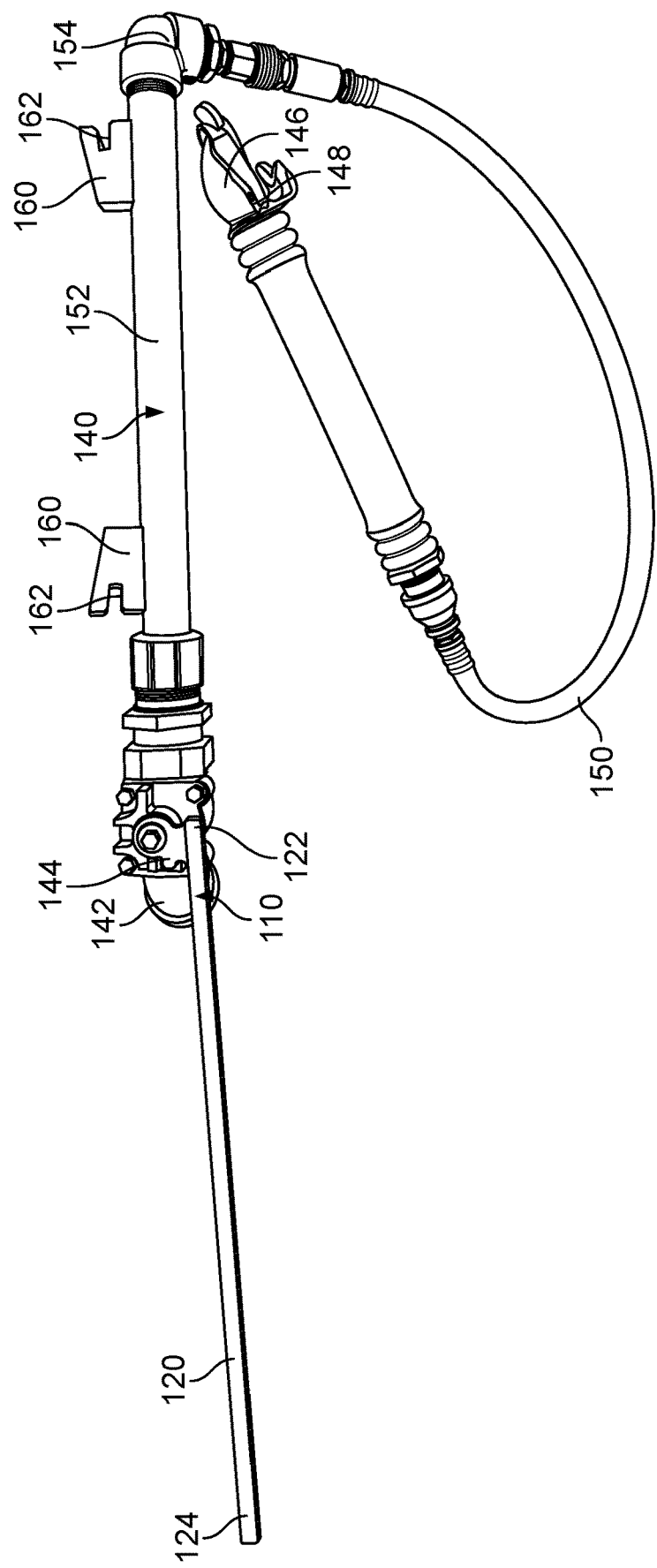
FIG. 5 depicts a top view of the trip-cock assembly in an extended position of the exemplary railcar motion control system for a railcar of FIG. 2 as disclosed herein.

FIG. 5 illustrates an exemplary trip-cock assembly 110 comprising an extended trip-cock lever 120 having a first end 122 that is connected to the valve assembly 140 and an unsupported second end 124 opposite the first end 122. The valve assembly 140 may comprise a first end 142 having a valve 144 and a second end 146 having a coupler or fitting 148 to connect to a standard railcar brake pipe. In some embodiments, the valve 144 may be a standard cock valve as known to one skilled in the art. In other embodiments, the valve 144 may be a solenoid valve that is electromechanically controlled to release air from the pneumatic braking system 20 of the unattended railcar 10 in a controlled or predetermined manner. In addition to the solenoid valve, the trip-cock assembly 110 may have a pressure sensor to determine the pressure within the railcar braking system 20. For example, when the trip-lever 120 contacts the trip arm, the trip-lever rotation may send a signal to open the solenoid valve to release air from the brake system 20. The solenoid valve may be programmed to release the air from the pneumatic braking system 20 slowly such that the brakes are applied gradually and can be applied for an extended amount of time. The solenoid valve may be programmed to drop the pressure in the braking system 20 by approximately 20 psi or within a range of 10 to 30 psi, which would cause the brakes to engage the wheels initiating the railcar 10 to a controlled stop. After the pressure drop is sensed by the pressure sensor, the solenoid valve may close, thereby keeping the brakes engaged and not allowing the pressure to drop near ambient pressure where the brakes may release. Releasing the air slowly in a controlled manner can be useful because in some railcar braking systems, the brakes are inoperable when all of the air is released from the system. By releasing the air in a controlled manner, the brakes can be applied for a longer amount of time, which can be useful if the railcar is traveling at a speed greater than fifteen miles per hour, or if the railyard has a slope or grade making the distance longer to stop the railcar 10. Additionally, applying the brakes in a more controlled manner may reduce wear on the wheels and components 32 of the braking system 20. To operate the solenoid valve, a power source such as a battery may be included on the trip-cock assembly 110.

A flexible hose or tubing 150 may connect the fitting 148 to a rigid pipe 152 through a pipe fitting 154, such as an elbow pipe connector, or other connection means. FIG. 6 illustrates the trip-cock assembly 110 in a position with the trip-cock lever 120 in a folded position, where the trip-cock lever is positioned above the rigid pipe 152 to reduce the length of the trip-cock assembly 110, which enables an operator to easily carry and install the trip-cock assembly 110 onto a railcar 10. While the exemplary valve assembly 140 shown in FIGS. 5 and 6 shows two different diameters for the flexible tubing 150, the tubing 150 may be a single diameter and formed of a single piece.

Figure 8:
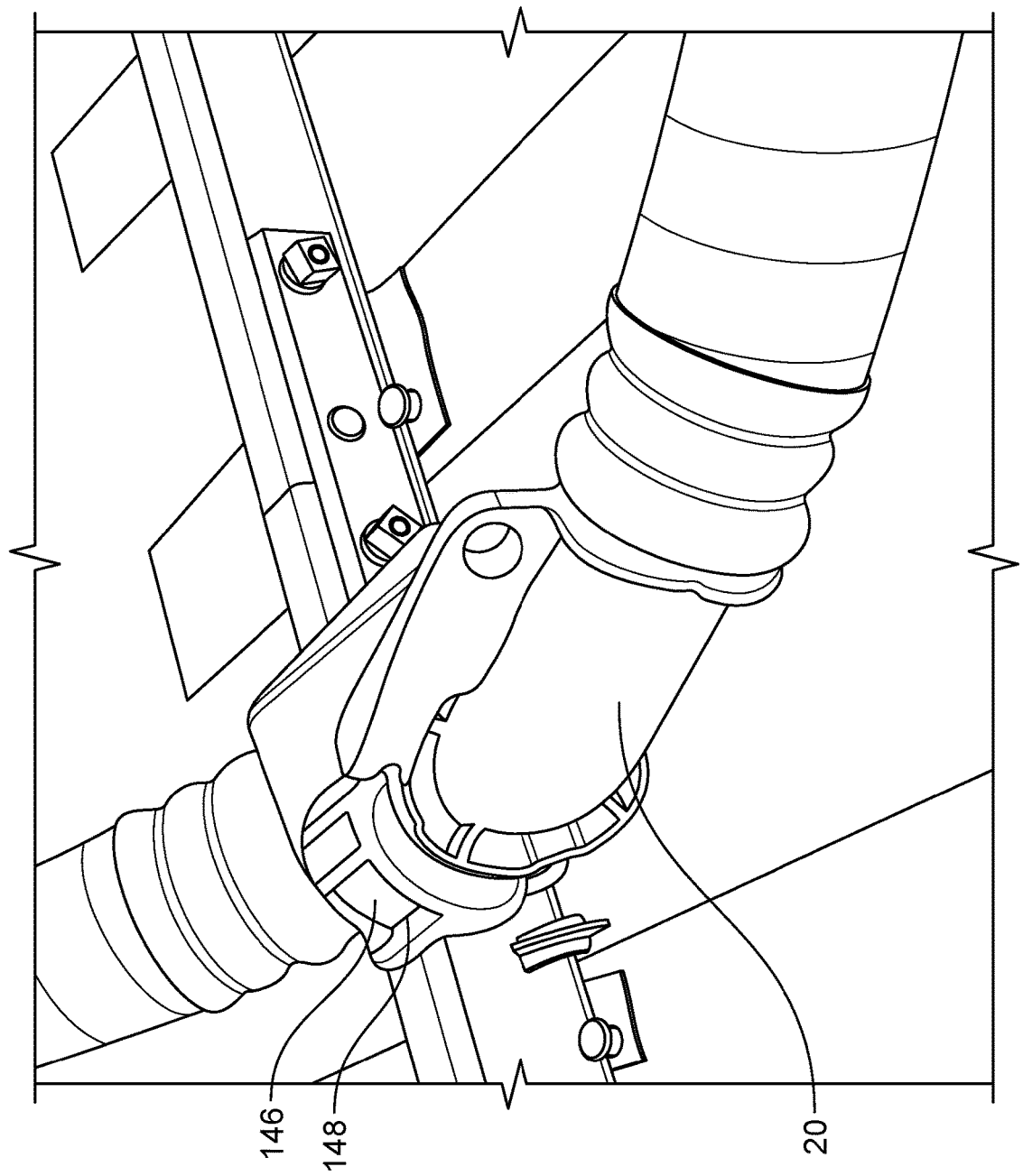
FIG. 8 depicts a perspective view of the engagement of a coupler of the trip-cock assembly to a braking system of the railcar as disclosed herein.
Figure 9:
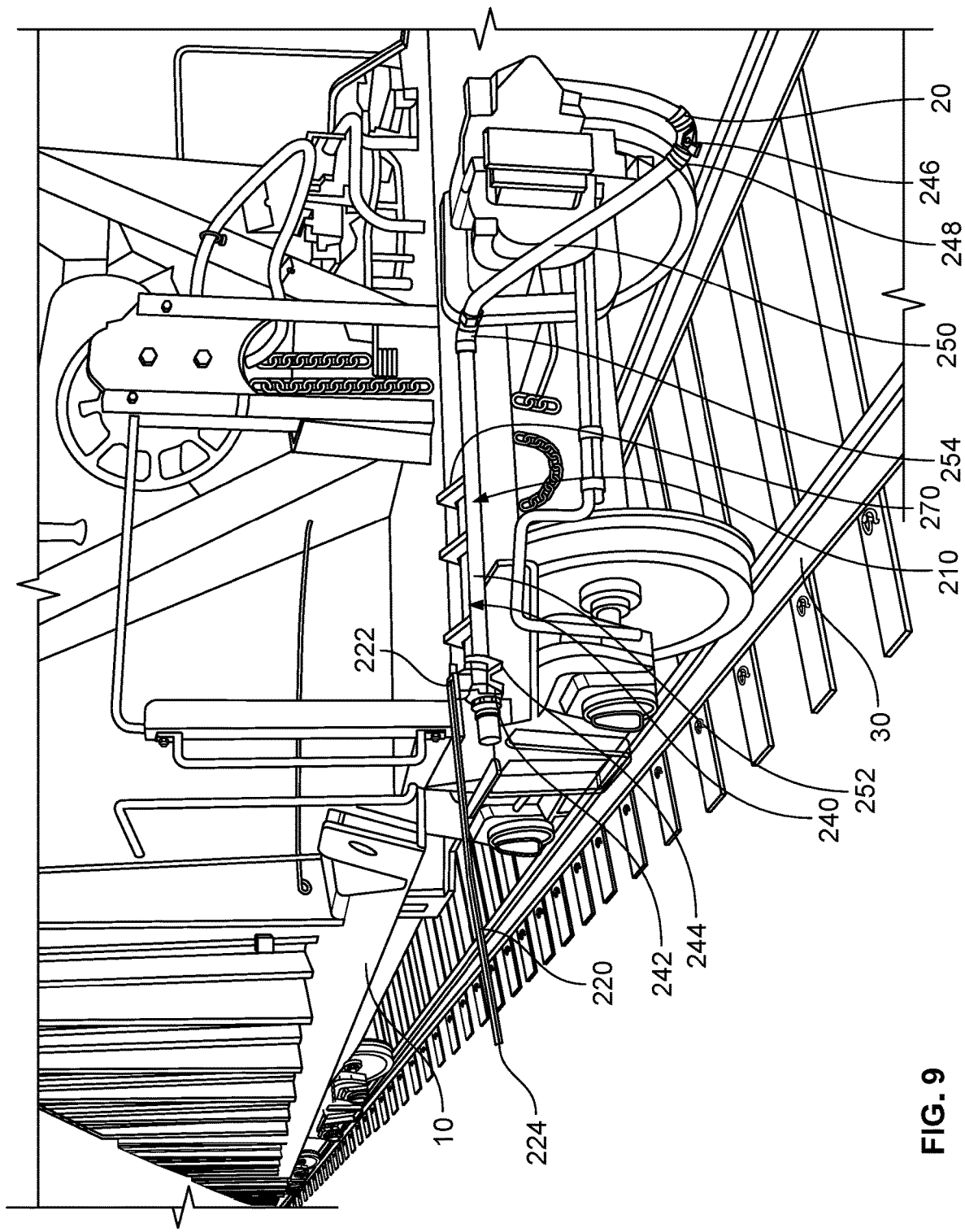
FIG. 9 depicts a left perspective view of an alternate attachment to the railcar for the trip-cock assembly attached to a railcar of the exemplary railcar motion control system of FIG. 1 as disclosed herein.
Figure 10:
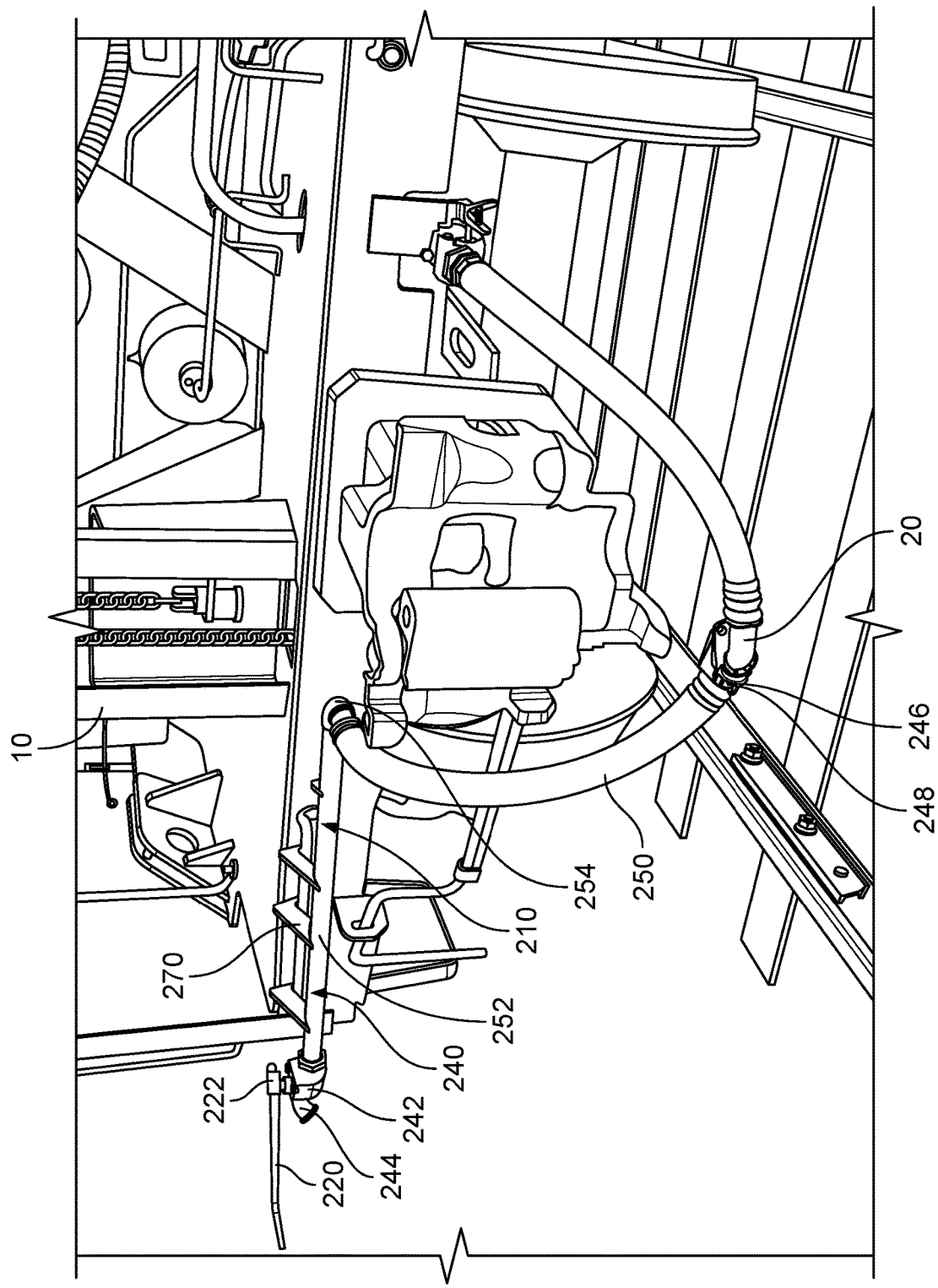
FIG. 10 depicts a right rear perspective view of the trip-cock assembly of FIG. 9 attached to a railcar as disclosed herein.
Figure 11:
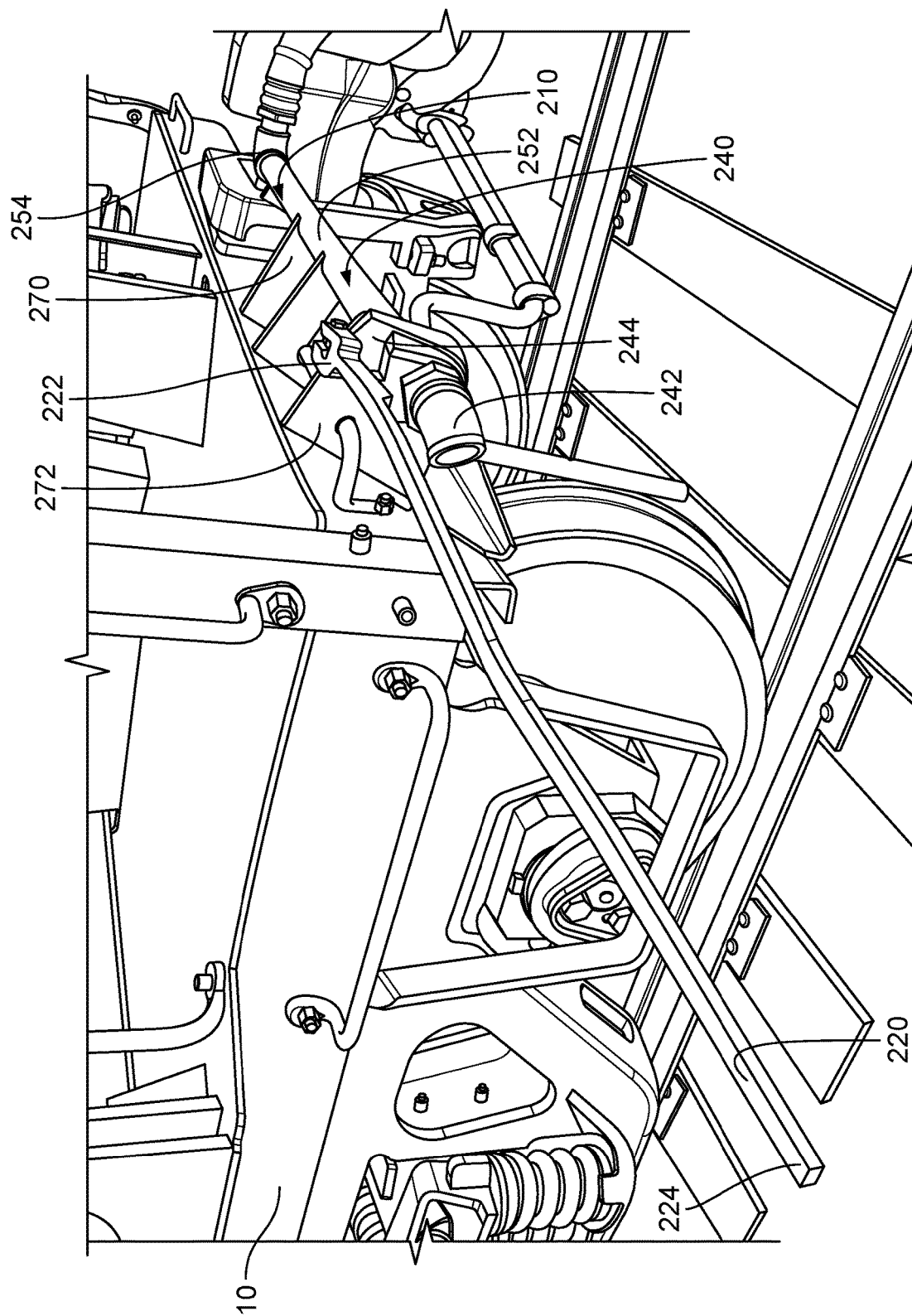
FIG. 11 depicts a left perspective view of the trip-cock assembly of FIG. 9 attached to a railcar as disclosed herein.
Figure 12:
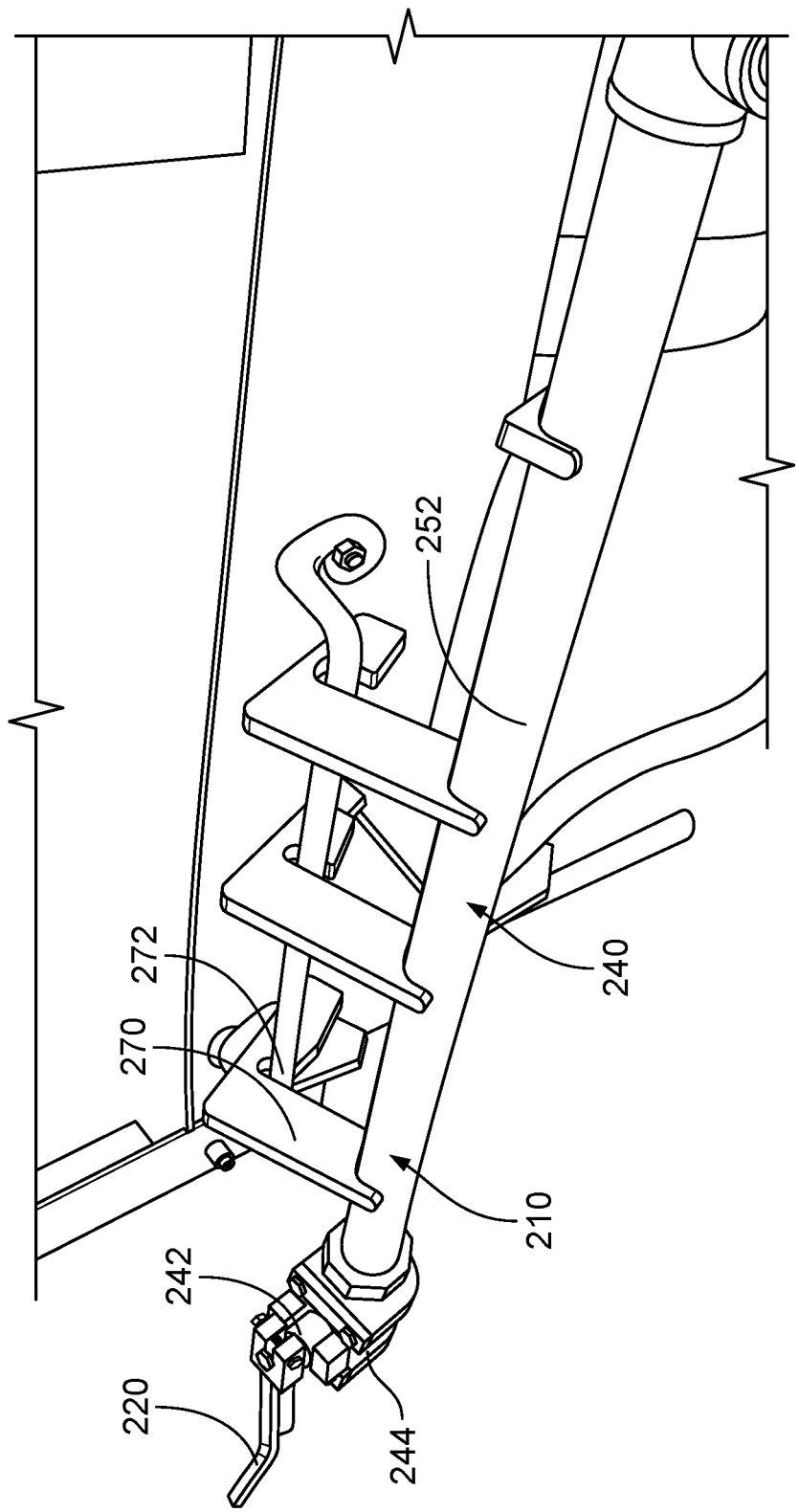
FIG. 12 depicts a top right perspective view of the trip-cock assembly of FIG. 9 attached to a railcar as disclosed herein.
Figure 13:
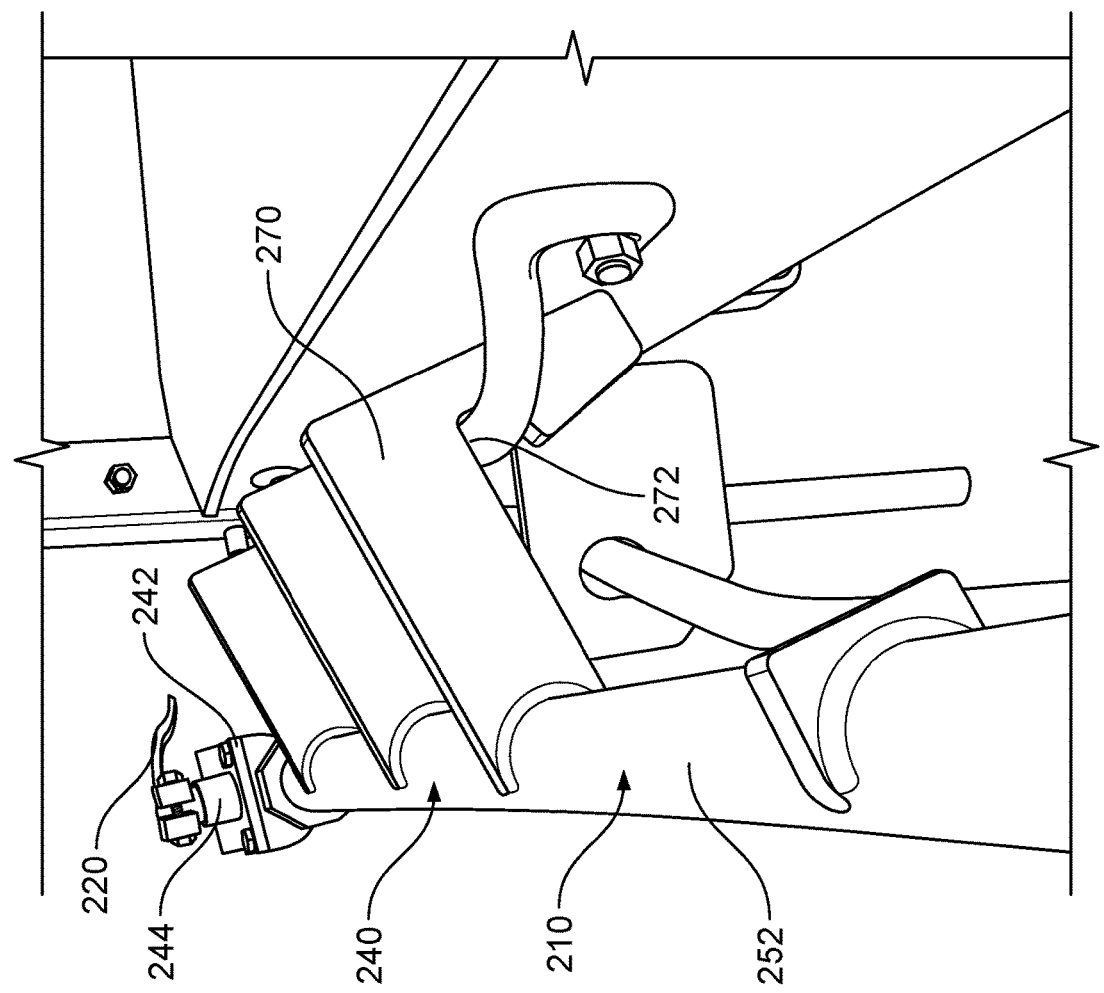
FIG. 13 depicts a right side view of the trip-cock assembly of FIG. 9 attached to a railcar as disclosed herein.
Figure 14:
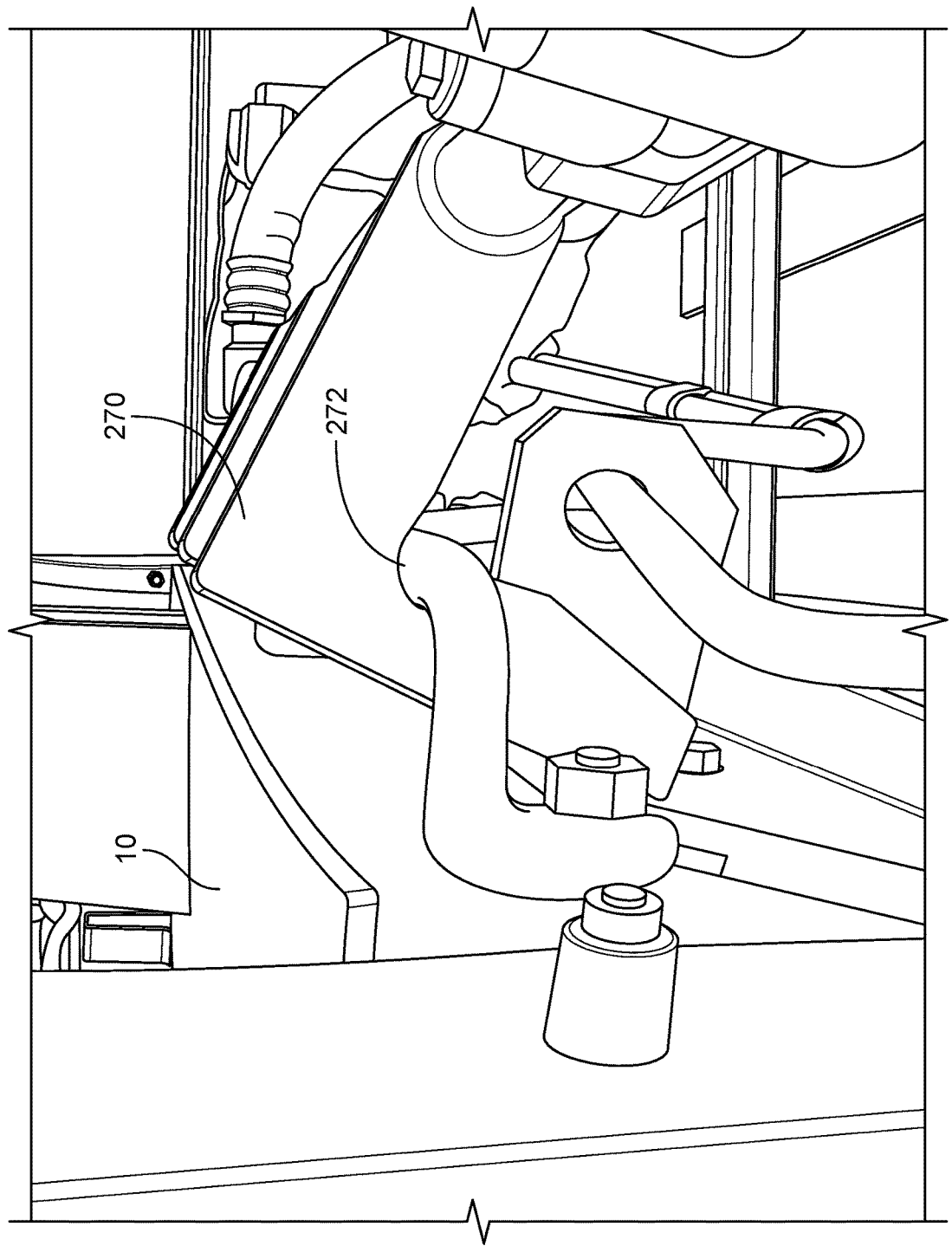
FIG. 14 depicts an enlarged left side view of the attachment of the trip-cock assembly of FIG. 9 to a railcar as disclosed herein.

FIGS. 7A and 7B illustrate the rigid pipe portion 152 of the trip-cock assembly 110. The pipe 152 has a plurality of lugs 160, where each lug 160 has an opening 162 with a pair of converging surfaces 164, 166 that connect to inner surface 168. The outer portion of the opening 162 may have a greater width than the width of the inner portion of the opening 162. For example, the outer portion of the opening 162 may have a width of approximately 0.50 inches, or within a range of 0.375 inches and 0.625 inches, and the inner portion of the opening 162 may have a width of approximately 0.375 inches, or within a range of 0.25 inches and 0.50 inches. For example, the inner surfaces 168 of the pair of lugs 160 may have a distance L between them, where the distance L may be approximately 15.75 inches, or within 15.5 inches and 16 inches. Because of the various makes and models of railcars as well as to address manufacturing tolerances, the dimensions of the mounting features for the trip-cock assembly 110 may be adjusted to ensure the proper fit and that the trip-cock assembly 110 is properly secured to the unattended railcar 10. The lugs 160 and their corresponding openings 162 may help to locate the trip-cock assembly 110 on the railcar 10 such that the trip-cock lever 120 extends beyond the exterior perimeter of the railcar 10. Optionally, the lugs 160 may help to ensure that the valve 144 is positioned beyond the exterior perimeter of the railcar 10 as well. The rigid pipe 152 may have a nominal inside diameter of approximately 1.25 inches, or within a range of 1.00 and 1.50 inches, or 1.00 inches and 2.00 inches. In addition, pipe 152 may be formed from schedule 80 pipe. FIG. 8 illustrates an exemplary connection of the coupler 148 of the trip-cock assembly 110 to the railcar brake system 20.

The lugs 160 may be permanently or releasably attached to the rigid pipe 152. For example, if the lugs 160 are permanently attached to the rigid pipe 152, the lugs 160 may be welded, brazed, bonded, or other permanent means in which the lugs 160 are not easily removed. As an alternate option, the lugs 160 may be releasably connected to the rigid pipe 152. For instance, the lugs 160 may be attached by a mechanical connector such as a threaded connection such that the lugs 160 may be removed and repositioned to change the distance between the lugs 160. By adjusting the position of the lugs 160 along the length of the pipe 152, the trip-cock assembly 140 may be adjusted in the field to mount on a variety of locations of the railcar 10. As another option, the lugs 160 may be rotated to adjust the orientation of the openings 162 to provide additional mounting options. As an example, the openings 162 may be oriented where the openings 162 face each other, where the openings 162 are oriented away from each other, or where the openings 162 are oriented in the same direction.

In some embodiments, the trip-cock assembly 110 may be configured to adapt to a pneumatic railcar braking system 20 where the braking system 20 comprises a multi-pipe braking system, which may have a separate control line from the main pressurized line. The multi-pipe braking system may comprise two pipes, where a first pipe may comprise the main pressurized line with the air required to apply the brakes and the second pipe, or control line that may be pressurized with the air required to control the application of the brakes. In the two-pipe system, the trip-cock assembly 110 may be connected to the first pipe of the brake system 20 as described above such that when the trip lever 120 contacts the trip arm 180 to activate the valve 144 to release the air from the braking system 20, the air is released from the second pipe causing the air pressure to drop and activate the brakes on the railcar 10. Alternatively, the trip-cock assembly 110 may be attached to or inserted into the second pipe to control the application of the brakes depending on the set-up of the multi-pipe braking system. In other two-pipe braking systems, the first pipe may be pressurized with the air required to apply the brakes and the second pipe may provide an electrical signal to control a valve on the railcar to apply the brakes. In this type of system, when the trip lever 120 contacts the trip arm 180, the trip-cock assembly 110 may provide an electrical signal to a control valve on the railcar 10 to release the air pressure and activate the brakes.

This two-pipe system may provide greater positive control of the braking of the railcars, because the control of the air pressure is separated from the air pressure for applying the brakes.

For the embodiment of the trip-cock assembly 210 shown in FIGS. 9-14, the features are referred to using similar reference numerals under the "2xx" series of reference numerals, rather than "1xx" as used in the embodiment of FIGS. 1-8. Accordingly, certain features of the trip-cock assembly 210 that were already described above with respect to trip-cock assembly 110 of FIGS. 1-8 may be described in lesser detail, or may not be described at all. Trip-cock assembly 210 may comprise a trip-cock lever 220 connected to a valve assembly 240. The valve assembly 240 may have a valve 244 at a first end 242 and a coupler 248 at a second end 246 that connects to the railcar brake system 20. The trip-cock assembly 210 may attach to the railcar 10 by a plurality of hooks elements 270 that connect to the rigid pipe 252 of the valve assembly 240. Each hook 270 may extend from an upper or side portion of the rigid pipe 252, where each hook 270 is positioned along the length of the rigid pipe 252. In addition, each hook 270 may have an opening 272 that opens downward to engage a protrusion or other feature of the railcar 10 as described above. The hooks 270 may support the trip-cock assembly 210 to keep the trip-cock lever 220 substantially horizontal. The plurality of hooks 270 may be evenly spaced or unevenly spaced along the length of the rigid pipe 252.

Figure 15:
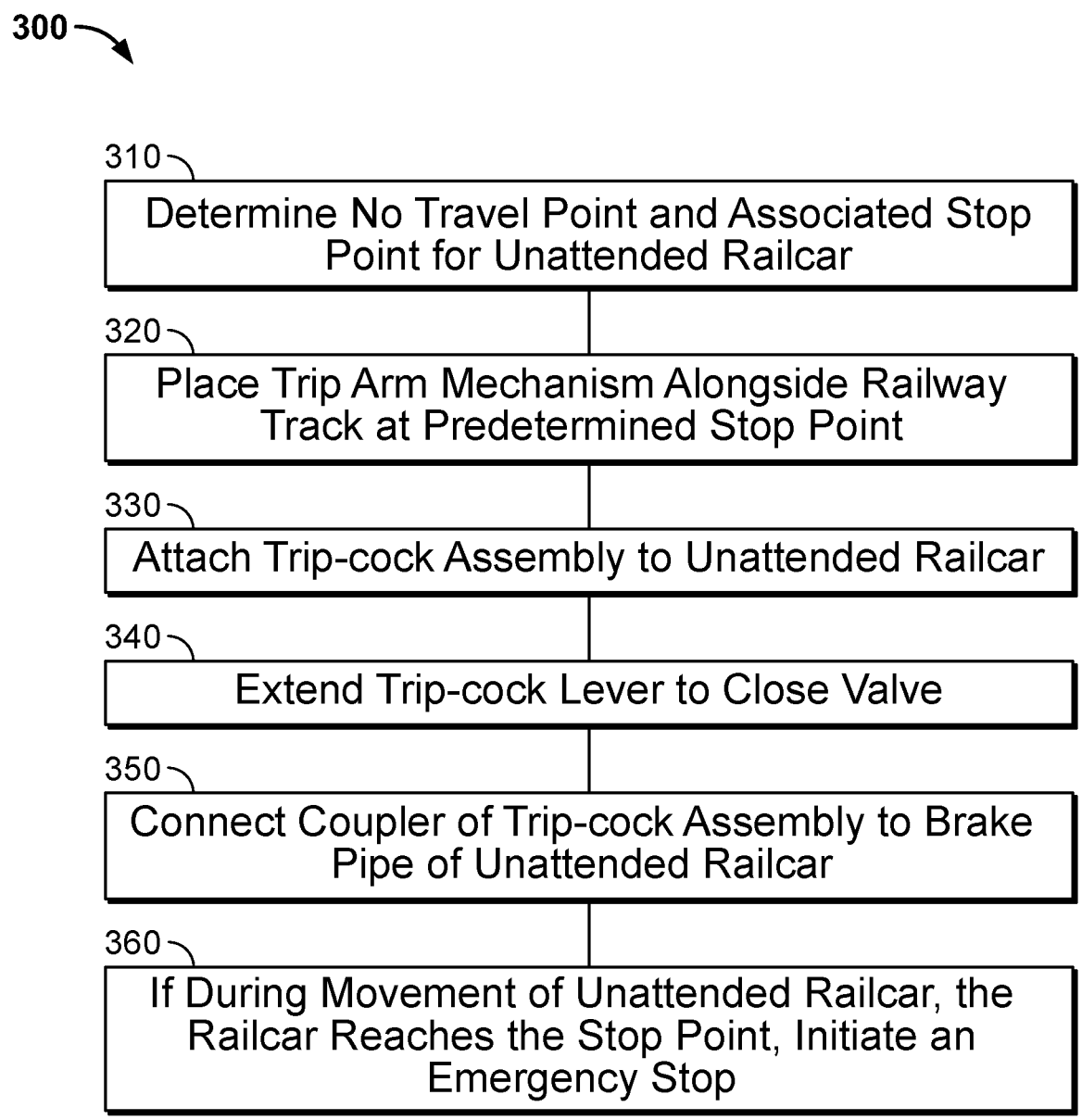
FIG. 15 depicts a method for setting up the motion control system of FIG. 1 as disclosed herein.

FIG. 15 illustrates an exemplary method 300 of using the railcar motion control systems 100, 200. First, a user may determine a no travel point that an unattended railcar 10 needs to be secured along the railway track 30 and an associated stop point 182 to initiate stopping or braking such that the unattended railcar 10 will stop prior to the no travel point (310). Next, the trip arm 180 may be placed or installed at the stop point 182 alongside the railway track (320). The trip-cock assembly 110 may then be attached to the unattended railcar 10 (330) with the trip-cock lever 120 extended to close the valve 144 (340). The valve assembly 140 may next be connected to the brake pipe of the unattended railcar 10 (350). Lastly, if during movement of unattended railcar 10, the railcar reaches the stop point 182, an emergency stop may be initiated by the trip arm 180 contacting the trip-cock lever 120 (360).

Figure 16:
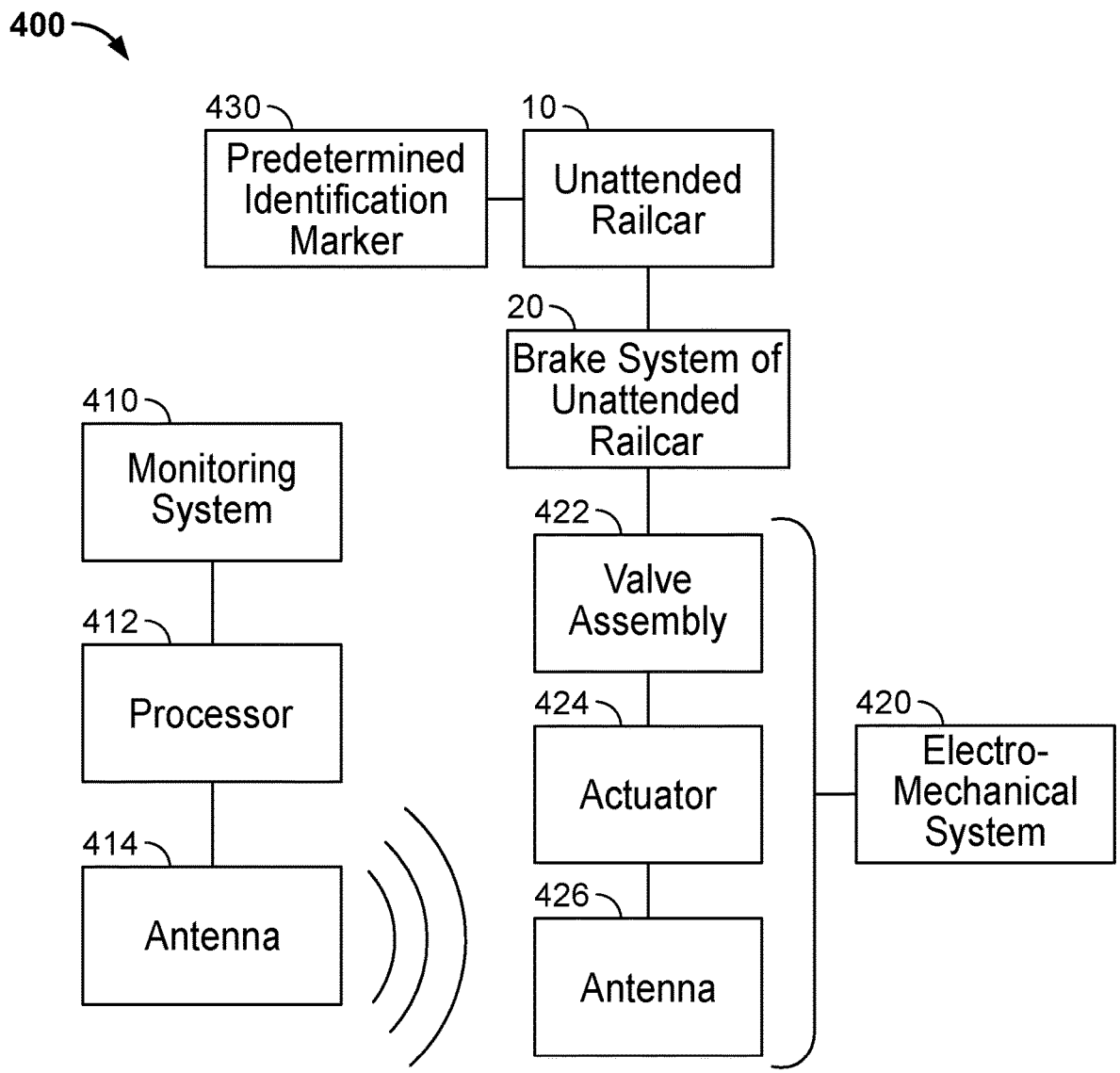
FIG. 16 depicts a schematic of an alternate embodiment of the railcar motion control system for a railcar as disclosed herein.

FIG. 16 illustrates an alternate embodiment of the railcar motion control system 400. Unlike the systems described in embodiments of systems 100 and 200, a monitoring system 410 may be placed near the railway tracks at a predetermined stop point or may be positioned in a control tower or other remote location to observe the railway tracks at the predetermined stop point. The monitoring system 410 may be one of a plurality of monitoring systems or combination of the plurality of monitoring systems, such as a visual monitoring system, a radar-based monitoring system, a pressure or weight-based monitoring system, a radio frequency localization monitoring system, a laser-based system, a global positioning system (GPS) tracking system, an optical sensor-based system, or other systems known to one skilled in the art to detect and observe the movement of the unattended railcar 10. The plurality of exemplary monitoring systems are discussed in more detail below. The predetermined stop point may designate the location on the track to initiate an emergency stop to keep the unattended railcar 10 or an unattended railcar 10 positioned at either a front end, a central region, or a rear end of a group of unattended railcars if they are linked together from passing a no travel point. The monitoring system 410 may include or be connected to a processor 412 that may operate in conjunction with a predetermined identification marker 430 on the unattended railcar 10 to determine when the unattended railcar 10 is moving or has reached the predetermined stop point. The identification marker 430 may be placed anywhere on the unattended railcar 10 such as to a front, a central region, or a rear of the unattended railcar 10. When a group of unattended railcars is being moved along the railway tracks, the predetermined identification marker 430 may be attached to any of the unattended railcars 10 within the group, such as the front railcar, the rear railcar, or any of the railcars in between the front railcar and the rear railcar. The railcar motion control system 400 may also comprise an electromechanical system 420 comprising a valve assembly 422, which may include a solenoid valve, an antenna 424, and/or an actuator 426 that is connected to the pneumatic brake system 20 of the unattended railcar 10. The valve assembly 422 may be connected to the brake pipe of the pneumatic braking system 20. The electromechanical system 420 may keep the pneumatic braking system 20 pressurized to allow the unattended railcar 10 to be able to be moved. When an unattended railcar 10 having the predetermined identification marker 430 reaches the predetermined stop point, the processor 412 of the monitoring system 410 may send a wireless signal through the antenna 414 to a corresponding antenna 424 of the electromechanical system 420. Upon receiving the emergency stop signal from the processor 412, the solenoid valve, the actuator 426, or similar device may open the valve assembly 422 to release the pressurized air within the pneumatic braking system 20 of the railcar 10. The solenoid valve may act as described above to release the air from the braking system 20 in a controlled or predetermined manner. Thus, the release of the pressurized air may cause the brakes to engage bringing the unattended railcar 10 to a stop.

As discussed above, one option for the monitoring system 410 may be a visual monitoring system. The visual monitoring system may comprise a video camera system or other video monitoring device that may be positioned alongside the railway tracks at a predetermined stop point or may be positioned in a control tower or other remote location, such as a satellite or other location with a view of the railway tracks at the predetermined stop point. For example, the visual monitoring system may be placed up to a half mile away from the predetermined stop point, up to two miles away from the predetermined stop point, up to four miles away from the predetermined stop point, or even up to eight miles away from the predetermined stop point. In some embodiments, the video monitoring device may be positioned on a drone flying above the railyard. The video camera system may be connected to the processor 412 that may have visual recognition capability such as to recognize the predetermined identification marker 430 on the unattended railcar 10. In addition, the video camera system may comprise a single video camera or a plurality of video cameras. Furthermore, the video camera system may operate in the visual spectrum and may also operate in the infrared spectrum or have other low lighting capability. For the visual monitoring system, the predetermined identification marker 430 may be a painted number on the unattended railcar 10 or a releasable tag that can be attached to the railcar 10. When an unattended railcar 10 having the predetermined identification marker 430 reaches the predetermined stop point, the processor 412 of the visual monitoring system will recognize the predetermined identification marker 430 in an image captured by the video camera causing the processor 412 of the video monitoring system 410 to send a wireless signal through the antenna 414 to initiate an emergency stop of the unattended railcar 10.

Another option for the monitoring system 410 may be a radar-based system. For example, a pulse radar system, or a pulse-Doppler radar system, or a Continuous-Wave (CW) radar system using Doppler, or a phased array radar system may be positioned to observe the predetermined stop point and to detect and track the motion of the unattended railcars. As the radar-based monitoring system recognizes that an unattended railcar 10 reaches the predetermined stop point, the processor 412 of the radar-based monitoring system 410 will send a wireless signal through the antenna 414 to initiate an emergency stop of the unattended railcar 10.

Another option for the monitoring system 410 may be a pressure or weight-based monitoring system. For instance, a weight-based monitoring system may include a load cell or pressure sensitive device mounted on or near the railway tracks 30 at the predetermined stop point. When the unattended railcar 10 reaches the load cell, the processor may detect the increased force on the load cell and send a wireless signal through the antenna 414 to initiate an emergency stop of the unattended railcar 10.

Yet another option for the monitoring system 410 may be a radio frequency localization system. Here, the radio frequency localization system may include a plurality of antennas located in multiple locations to receive a radio frequency signal from the predetermined identification marker 430, which is this system may be a radio frequency beacon that transmits a signal that is monitored by a plurality of antennas or cellular towers. The plurality of antennas may be connected to a processor 412, which uses the signal to determine the position of the unattended railcar 10 on the tracks using multilateration as known to one skilled in the art. When the unattended railcar 10 reaches the predetermined stop point, the processor will send a wireless signal through the antenna 416 to initiate an emergency stop of the unattended railcar 10. Another option of a radio frequency localization system may use a radio frequency identification device (RFID). The predetermined identification marker 430 may be RFID tag such that when the identification marker 430 passes near an RFID reader placed near or on the railway tracks, the processor 412 will send a wireless signal through the antenna 414 to initiate an emergency stop of the unattended railcar 10.

Still another option for the monitoring system 410 may use a global positioning device. Here, the predetermined marker 430 may be a global positioning system (GPS) device that is secured to the unattended railcar 10. The monitoring system 410 may then track the movement of unattended railcar with the GPS device by monitoring the signal from the GPS device. When an unattended railcar 10 is moved along the tracks 30, the processor 412 examines the signal being received from GPS device and determines the position of the unattended railcar 10 on the tracks. When the unattended railcar 10 reaches the predetermined stop point, the processor will send a wireless signal through the antenna 414 to initiate an emergency stop of the unattended railcar 10.

In addition, another option for the monitoring system 410 may use a laser-based system. For example, laser-based system, such as a LIDAR type system that may be positioned to observe the predetermined stop point and to detect and track the motion of the unattended railcars. As the laser-based monitoring system recognizes that an unattended railcar 10 reaches the predetermined stop point, the processor 412 of the laser-based monitoring system 410 will send a wireless signal through the antenna 414 to initiate an emergency stop of the unattended railcar 10.

As still, another option for the monitoring system 410 may use an optical sensor-based system. For example, an optical circuit such as a set of light gates may be positioned alongside the railway tracks, such that an emitter is positioned at a first position and a receiver is positioned at a second position on the opposite side of the railway tracks or between the two railway tracks. When an unattended railcar 10 reaches the predetermined stop point, the optical circuit of the light gates may be interrupted. Upon detecting this interruption, the processor 412 of the optical sensor-based monitoring system 410 will send a wireless signal through the antenna 414 to initiate an emergency stop of the unattended railcar 10.

The processor 412 may be utilized to process data received from the monitoring system 410. The processor 412 may be a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The one or more implementations described throughout this disclosure may utilize logical blocks, modules, and circuits that may be implemented or performed with a processor.

The processor 412 may be used to implement various aspects and features described herein. As such, the processor 412 may be configured to perform any desired operation on one or more data streams received from the monitoring system 410. Further, it will be appreciated that the processor 412 may execute multiple calculations, in parallel or serial, at a very high throughput frequency using the received data from the monitoring system 410 to determine the movement of the unattended railcar 10. As such, the processor 412 may be configured to execute hundreds of thousands, millions, or billions or more calculations per second. The processor 412 may include a processing unit and system memory to store and execute software instructions.

Figure 17:
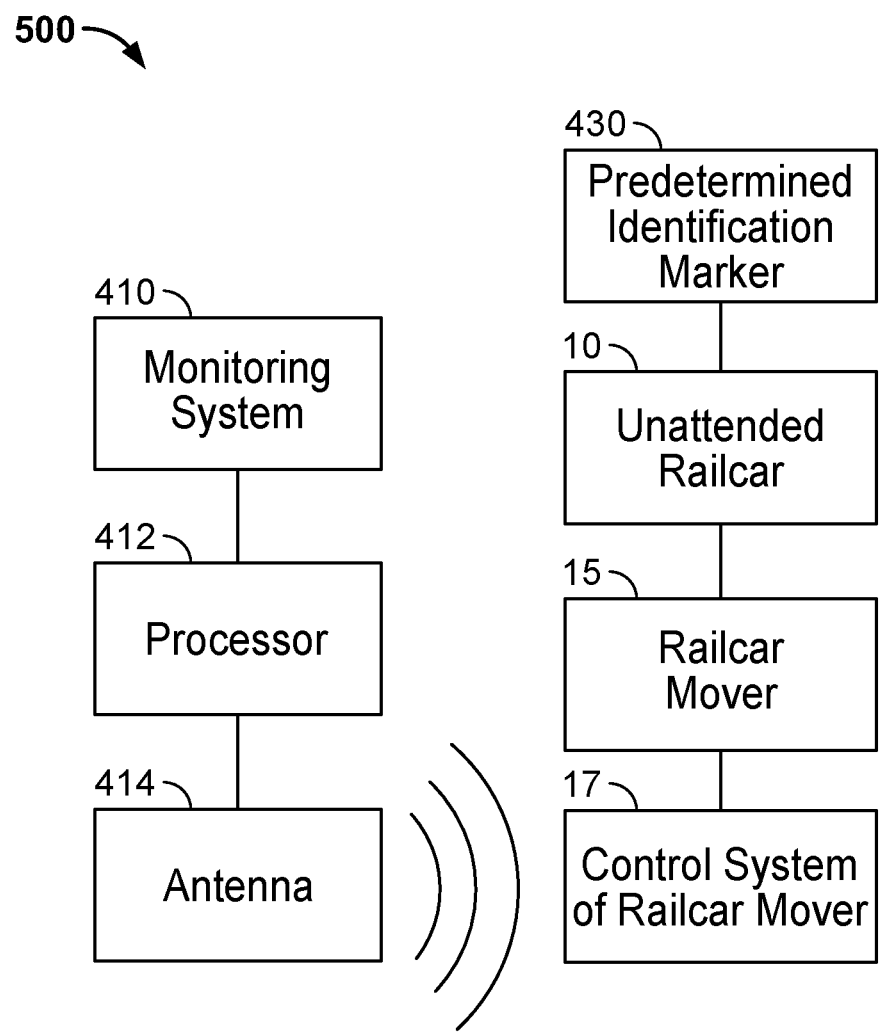
FIG. 17 depicts a schematic of an alternate embodiment of the railcar motion control system for a railcar as disclosed herein.

FIG. 17 illustrates another alternate embodiment of the railcar motion control system 500. Similar to the railcar motion control system 400, a monitoring system 410 may be placed alongside the railway tracks at a predetermined stop point or may be positioned in a control tower or other remote location to observe the railway tracks at the predetermined stop point. The monitoring system 410 may be a variety of monitoring systems or combination of monitoring systems as described above. The predetermined stop point may designate the location on the track to initiate an emergency stop to keep the unattended railcar 10 or an unattended railcar 10 positioned at either a front end, a central region, or a rear end of a group of unattended railcars if they are linked together from passing a no travel point. As discussed above, the unattended railcars 10 may be moved along the railyard by a railcar mover 15. The system 500 may communicate wirelessly to the control system 17 of the railcar mover 15. When an unattended railcar 10 having the predetermined identification marker 430, depending upon the type of monitoring system 410, reaches the predetermined stop point, the processor 412 of the monitoring system 410 may send a wireless signal through the antenna 414 to the control system 17 of the railcar mover 15. Upon receiving the emergency stop signal from the processor 412, the railcar mover 15 applies the brakes to the wheels. Thus, causing an emergency stop of the unattended railcar 10. As an alternative option, upon the processor 412 of the monitoring system 410 recognizing an unattended railcar 10 travelling to or beyond the predetermined stop point, the processor 412 may send an emergency stop signal to an operator of the railcar mover 15. The operator may apply the brakes either remotely or manually to cause an emergency stop of the unattended railcar 10.

Figure 18:
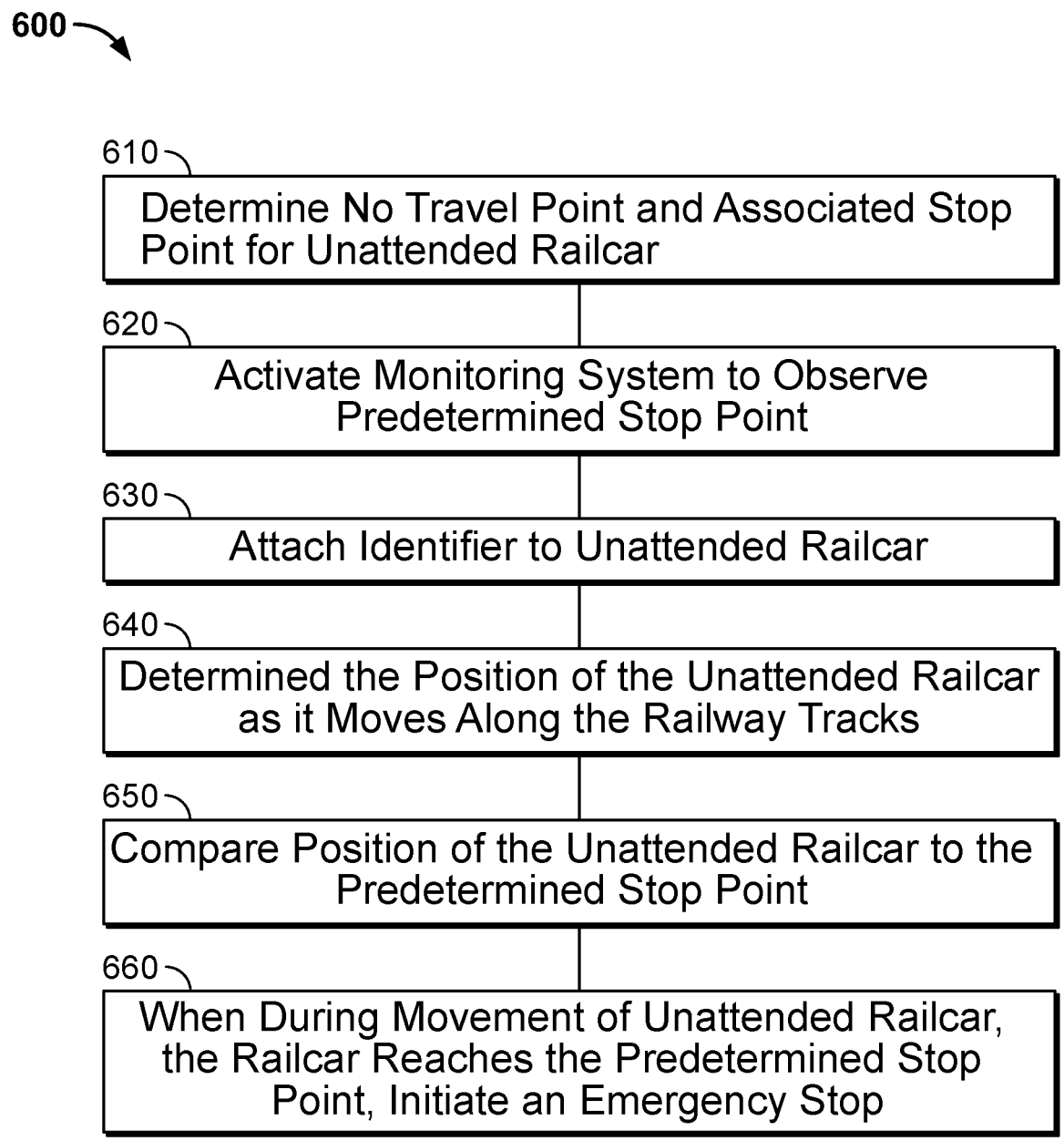
FIG. 18 depicts a method for setting up the motion control system of FIGS. 16 and 17 as disclosed herein.

FIG. 18 illustrates the exemplary method 600 of using the railcar motion control systems 400, 500. First, a user may determine a no travel point that an unattended railcar 10 needs to be secured along the railway track 30 and an associated stop point to initiate stopping or braking such that the unattended railcar 10 will stop prior to the no travel point (610). Next, the monitoring system 410 may be placed at the predetermined stop point alongside the railway tracks, or may be positioned in a control tower or other remote location to observe the railway tracks at the predetermined stop point (620). The predetermined identification marker 430 may be attached to the unattended railcar 10 (630). The monitoring system 410 may determine the location of the unattended railcar 10 along the tracks 30 (640). Then, the processor 412 may compare the location of the unattended railcar 10 to the location of the predetermined stop point (650). Lastly, when during movement of unattended railcar 10, the railcar reaches the predetermined stop point; the processor 412 may send a signal via the antenna 414 to initiate an emergency stop of the unattended railcar 10 or group of unattended railcars by the any of the methods described herein or known to those skilled in the art (660).

Figure 19:
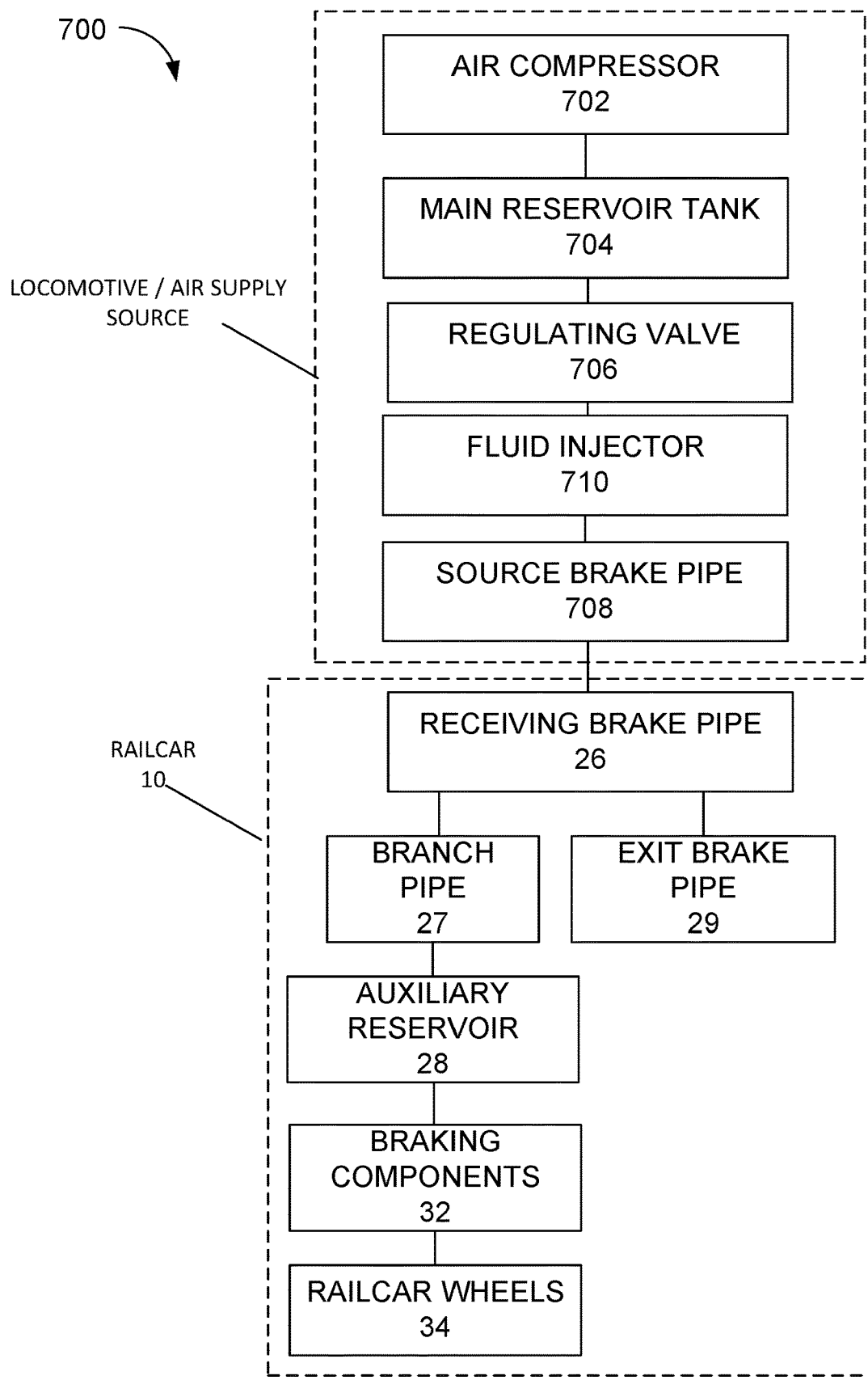
FIG. 19 depicts a schematic of the braking system of an exemplary railcar with a fluid injector as disclosed herein.

As another option to improve safety of railcar loading is illustrated in FIG. 19 is shown in the braking system 700 for a railcar 10. Braking system 700 may include a fluid injector 710 configured to inject a fluid as a fine mist within the pneumatic braking system 20 of the railcar 10. The fluid may include anti-freezing and/or anti-leak type properties. Braking system 700 includes an air compressor 702 that is connected to a main reservoir tank 704 to hold a portion of the compressed air. A regulating valve 706 may be positioned downstream of the reservoir tank to provide a predetermined pressure to the braking system 20. A source brake pipe 708 may be connected to the regulating valve 706. The fluid injector 710 may be arranged between the regulating valve 706 and the source brake pipe 708, wherein the fluid injector 710 injects the fluid into the braking system. The fluid injector 710 may comprise a pump that may include a metering device to meter the volume flow (mass flow) of fluid into the brake system 700. The system 700 may also include a valve to prevent flow of air into the injector 710, when the injector 710 is paused or stopped. The valve may be a one-way valve, a check-valve, or a back-pressure valve. The injector may be a constant volume pump that will can provide any necessary pressure to overcome the air pressure. As another option, the pump may be a metering type chemical injection pump that is adjusted to give a set flow rate for given set of conditions including properties of the injected fluid, brake system condition, and air supply temperature, and air supply pressure, and may include ambient air temperature.

The source brake pipe 708 may provide a connection point to the railcar 10 to provide the air supply of the braking system of the railcar 10. The air compressor 702, reservoir 704, regulating valve 706, and source brake pipe 708 may be similar to the components of the typical brake system 20 as described above and may be provided on a locomotive or other mobile platform such as a railcar mover or other vehicle arranged to operate on a railway track connected to the railcar 10. The source brake pipe 708 may be connected to a receiving brake pipe 26 of the railcar 10. In a typical braking system 20, the air compressor 22 pumps air into the braking system 20, the air exiting the compressor 22 may go through a dryer to remove the moisture, but even after exiting the dryer, the air may still include some amount of water vapor. This water vapor may condense, or in cooler conditions, freeze within the pneumatic braking system 20 causing the valves or other components within the railcar's braking system to corrode or malfunction. Air compressors, even oil-free compressors, use oil to lubricate the mechanical parts such as bearings. The compressor oil may mix with the air and enter the dryer or brake-system 20. If an air, oil, and water mixture enters a valve in the brake system 20, and the air pressure may be reduced, and then the water in the oil may solidify or freeze that may cause the brakes to malfunction, when operating in below freezing temperatures. While some air leakage is present around the seals due to microscopic or small gaps around the seals, in below freezing temperatures, the stiffness of synthetic elastomers used in the seals and components of the braking system 20 may increase, which may cause the gaps around and in the seals to increase air leakage within the braking system 20 to rise over an acceptable limit.

In braking system 700, however, the fluid injector 710 injects a fluid to help counteract any moisture buildup in the braking system. The injected fluid may include an anti-freeze type fluid that has a freezing point at or below −40° C., or within a range of −40° C. and −80° C. to help prevent freezing of any moisture within the pneumatic braking system 700 of the railcar 10 where the anti-freeze type fluid that may absorb and/or displace moisture within the braking system 700, reduce the freezing temperature of moisture within the system, and may dissolve, displace, or dilute any compressor lubrication oil present in the system 700. In addition to, or as another option, the injected fluid may be chemically compatible with the elastomeric materials present in the braking system 700 and include liquid droplets which may expand as the liquid transitions to a gas which may help fill the gaps around the seals located within the braking system 700 restricting air flow passing around the seals to reduce air leakage in the braking system 700. The injected fluid may have a viscosity greater than the air in the system 700 and may be injected as a mist so it can be carried within the pressurized air and condense around regions near the seals to reduce any air leakage. Chemical compatibility, lubrication properties, and anti-corrosion properties of the injected fluid may improve the life of the seals as the seals may last longer if they are moving on a smooth and wet lubricated surface. The fluid may also include a corrosion inhibitor and have a low-flammability.

The fluid may be injected continually, or intermittently when required, for either the anti-freeze type fluid (ice melting function) or the gap-filling fluid (anti-leak) function. In addition, the fluid may be injected at a pressure greater than the brake-pipe pressure of approximately 150 psi, or in a range of 90 psi and 200 psi. Alternatively, the fluid may be injected at higher pressures of up to 1500 psi. As another consideration, the flow rate of the injected fluid may be a function of the airflow rate, the air leakage in the system 700, and the number of connected railcars. The volume of injected fluid may range from near zero to a ratio of the rate air leakage. For example, the volume, or flow rate, of injected fluid may be approximately 0.60 cubic feet per minute (cfm), which equates to approximately 1% of an air leakage rate of 60 cfm. In some instances, such as needing to melt an ice buildup in the braking system 20, the volume of injected fluid may need to be increased to a range of 2 to 4 cubic feet per minute. The system 700 may also include a pressure sensor to measure the brake-pipe pressure within the system and a control system to adjust the fluid injection flow rate. For example, if the pressure sensor senses a small drop in brake-pipe pressure, the control system may increase the flow rate of the injected fluid to help reduce the air leakage rate, or if the system is injecting fluid intermittently, the control system might send a signal for the fluid injector to inject fluid more frequently. Additionally, the control system may monitor the time or rate that the pressure increases, such as initial hookup or initial charging of the system, where if the time exceeds a predetermined time, the control system may determine the system has higher than expected air leakage rate and send a signal for the fluid injector 710 to inject fluid into system 700. In some embodiments where the fluid injection pressure is over 200 psi, the flow rate may be reduced accordingly to prevent the overall brake-pipe pressure from exceeding 150 psi.

The injection fluid may be a mixture including a component that reacts with water, such as isopropyl alcohol or methyl-hydrate, and may contain a lubricating component or feature, and a corrosion inhibiting feature. Further, the injection fluid would need to remain a liquid during extreme winter ambient temperature of less than approximately –40° C. The fluid may include an oil, such as a synthetic miscible air tool oil intended for use where compressed air has high moisture content. The fluid may include water, such as a mixture of approximately 45%-49% alcohol, 45%-49% distilled water, 1%-2% triethanolamine phosphate (surfactant), and 1%-2% sodium mercaptobenzothiazole (stenching agent). In other embodiments, the fluid may include water, such as a mixture of approximately 40%-95% alcohol, 5%-60% distilled water, 0%-2% triethanolamine phosphate, and 0%-2% sodium mercaptobenzothiazole. In other embodiments, the fluid may be 100% alcohol. In embodiments, where the fluid may comprise a flammable component, the ratio of the flammable component to the air in the system will be below the lower explosive limit to prevent any combustion. Additionally, the injection fluid may include a leak detection component, such as a tracer dye that may be a biodegradable or fluorescent leak detection dye.

While various embodiments have been described, it will be apparent to those of ordinary skill in the art that many more embodiments and implementations are possible that are within the scope of the claims. The various dimensions described above are merely exemplary and may be changed as necessary. Accordingly, it will be apparent to those of ordinary skill in the art that many more embodiments and implementations are possible that are within the scope of the claims. Therefore, the embodiments described are only provided to aid in understanding the claims and do not limit the scope of the claims.

What is claimed is:

1. A system for controlling motion of an unattended railcar comprising:
    a trip-cock assembly configured to connect to a pneumatic braking system of an unattended railcar, wherein the trip-cock assembly comprises:
        a trip-cock lever connected to a trip-cock valve assembly, wherein the trip-cock valve assembly includes a valve connected to a first end of a pipe and a fitting connected to a second end of the pipe, wherein the pipe has a first lug near the first end and a second lug near the second end, wherein the first lug and the second lug each have an opening extending through each lug and wherein each opening has a pair of converging surfaces, wherein the first lug and the second lug engage the unattended railcar to secure the trip-cock assembly to the unattended railcar, and wherein the trip-cock lever is adjustable from a folded position to an extended position, such that when the trip-cock lever is in the extended position, the trip-cock lever extends beyond an exterior perimeter of the unattended railcar, and
    a trip arm located adjacent a railway track at a predetermined stop point within a rail yard, wherein when the unattended railcar reaches the predetermined stop point the trip-cock lever contacts the trip arm, the trip-cock lever then opens the valve on the trip-cock valve assembly causing air in the pneumatic braking system of the unattended railcar to be released.

2. The system for controlling motion of an unattended railcar of claim 1, wherein the trip-cock lever is directly attached to the valve of the trip-cock assembly, and the fitting connects to a flexible hose, wherein the flexible hose includes a coupler configured to connect to a brake pipe of the pneumatic braking system of the unattended railcar.

3. The system for controlling motion of an unattended railcar of claim 1, when the trip-cock assembly is in the folded position, the trip-cock assembly has an overall length of less than 5 feet.

4. The system for controlling motion of an unattended railcar of claim 1, the trip-cock assembly has an overall weight of less than 50 pounds.

5. The system for controlling motion of an unattended railcar of claim 1, wherein the trip-cock assembly is arranged on the unattended railcar such that the trip-cock lever is in a substantially horizontal orientation.

6. The system for controlling motion of an unattended railcar of claim 1, wherein the trip-cock assembly is secured to the unattended railcar using a magnetic connection.

7. The system for controlling motion of an unattended railcar of claim 1, wherein the valve is a solenoid valve.

8. The system for controlling motion of an unattended railcar of claim 1, wherein the trip-cock assembly is releasably attached to the unattended railcar.

9. A method for controlling motion of an unattended railcar comprising:
    determining a no travel point along a railway track for an unattended railcar;
    determining a stop point to initiate braking for the unattended railcar prior to the no travel point;
    installing a trip arm at the stop point adjacent the railway track; and
    attaching a trip-cock assembly to the unattended railcar, wherein the trip-cock assembly is attached to a pneumatic braking system of the unattended railcar, wherein the trip-cock assembly includes a valve connected to a first end of a pipe and a fitting connected to a second end of the pipe opposite the first end, wherein the pipe has a first lug near the first end and a second lug near the second end, wherein the first lug and the second lug each have an opening extending through each lug and wherein each opening has a pair of converging surfaces, wherein the first lug and the second lug engage the unattended railcar to secure the trip-cock assembly to the unattended railcar, and wherein the trip-cock assembly further comprises a trip-cock lever having a first end connected to the valve and a second end that is unsupported opposite the first end, wherein the trip-cock lever extends beyond an exterior perimeter of the unattended railcar.

10. The method for controlling motion of an unattended railcar of claim 9, wherein when the unattended railcar reaches the stop point, the trip-cock lever contacts the trip arm causing the trip-cock lever to rotate which opens the valve causing air in the pneumatic braking system of the unattended railcar to be released.

11. The method for controlling motion of an unattended railcar of claim 9, wherein the pipe of the trip-cock assembly is secured to the unattended railcar using a mechanical connection.

12. The method for controlling motion of an unattended railcar of claim 9, wherein the trip-cock assembly has an overall weight of less than 50 pounds.

13. The method for controlling motion of an unattended railcar of claim 9, wherein the fitting of the trip-cock assembly is connected to a flexible hose, wherein the flexible hose is connected to the pneumatic braking system of an unattended railcar.

14. The method for controlling motion of an unattended railcar of claim 9, wherein the trip-cock assembly is releasably attached to the unattended railcar.

* * * * *